United States Patent
Bucuvalas

(10) Patent No.: US 10,521,209 B2
(45) Date of Patent: Dec. 31, 2019

(54) MACHINE-BASED NORMALIZATION OF MACHINE INSTRUCTIONS

(71) Applicant: PHASE CHANGE SOFTWARE LLC, Golden, CO (US)

(72) Inventor: Steven Bucuvalas, Golden, CO (US)

(73) Assignee: PHASE CHANGE SOFTWARE LLC, Golden, CO (US)

(*) Notice: Subject to any disclaimer, the term of this patent is extended or adjusted under 35 U.S.C. 154(b) by 0 days.

(21) Appl. No.: 15/572,926

(22) PCT Filed: May 11, 2016

(86) PCT No.: PCT/US2016/031882
§ 371 (c)(1),
(2) Date: Nov. 9, 2017

(87) PCT Pub. No.: WO2016/183211
PCT Pub. Date: Nov. 17, 2016

(65) Prior Publication Data
US 2018/0143814 A1      May 24, 2018

Related U.S. Application Data

(60) Provisional application No. 62/161,519, filed on May 14, 2015, provisional application No. 62/160,076, filed on May 12, 2015.

(51) Int. Cl.
*G06F 8/51*     (2018.01)
*G06F 8/72*     (2018.01)
*G06F 8/75*     (2018.01)

(52) U.S. Cl.
CPC ............... *G06F 8/51* (2013.01); *G06F 8/72* (2013.01); *G06F 8/75* (2013.01)

(58) Field of Classification Search
CPC ............... G06F 8/40; G06F 8/443; G06F 8/51
(Continued)

(56) References Cited

U.S. PATENT DOCUMENTS 5,394,347 A   2/1995  Kita et al.
5,418,793 A   5/1995  Chang et al.
(Continued)

FOREIGN PATENT DOCUMENTS

WO   WO 2008/143660   11/2008
WO   WO 2009/029760    3/2009
WO   WO 2018/222327   12/2018

OTHER PUBLICATIONS

Bucuvalas, Steve et al. "Control Ordered Behavior—Cob Paper" Technical Report; ioSemantics; Apr. 2015.
(Continued)

*Primary Examiner* — Wei Y Zhen
*Assistant Examiner* — Brahim Bourzik
(74) *Attorney, Agent, or Firm* — Jason H. Vick; Sheridan Ross, PC

(57) ABSTRACT

Computer source code maintenance represents a significant aspect of computer systems. Code that was developed for one platform, in one language, may require a significant investment in human effort to port such code to another platform or language. Converting source code to a language-agnostic source code allows a user to view the interaction of various portions of the source code in a unified view. Additionally, the language-agnostic source code may be automatically regenerated by a processor to a different platform or language. As a further benefit, documentation, standards-compliance, security, and/or other non-functional requirements may be provided to further enhance the utility of the original source code.

19 Claims, 33 Drawing Sheets

(58) Field of Classification Search
USPC ........................................................ 717/104
See application file for complete search history.

(56) References Cited

U.S. PATENT DOCUMENTS

| | | | |
|---|---|---|---|
| 5,652,899 | A | 7/1997 | Mays et al. |
| 5,852,825 | A | 12/1998 | Winslow |
| 5,920,716 | A * | 7/1999 | Johnson ................. G06F 8/425 |
| | | | 717/141 |
| 5,987,450 | A | 11/1999 | Levy |
| 6,173,440 | B1 | 1/2001 | Darty |
| 6,199,195 | B1 | 3/2001 | Goodwin et al. |
| 6,275,976 | B1 | 8/2001 | Scandura |
| 6,523,171 | B1 * | 2/2003 | Dupuy ...................... G06F 8/51 |
| | | | 717/136 |
| 7,024,661 | B2 | 4/2006 | Leino et al. |
| 7,334,216 | B2 | 2/2008 | Molina-Moreno et al. |
| 7,584,455 | B2 | 9/2009 | Ball |
| 7,596,778 | B2 | 9/2009 | Kolawa et al. |
| 7,710,988 | B1 | 5/2010 | Tripathi et al. |
| 7,779,382 | B2 | 8/2010 | Rehof et al. |
| 7,784,035 | B2 | 8/2010 | Kahlon et al. |
| 7,861,226 | B1 | 12/2010 | Episkopos et al. |
| 7,895,584 | B1 * | 2/2011 | Ma ...................... G06F 17/5045 |
| | | | 717/137 |
| 7,900,193 | B1 | 3/2011 | Kolawa et al. |
| 7,921,411 | B2 | 4/2011 | Chockler et al. |
| 7,941,438 | B2 | 5/2011 | Molina-Moreno et al. |
| 8,037,449 | B2 | 10/2011 | Iborra et al. |
| 8,332,864 | B2 | 12/2012 | Bose et al. |
| 8,484,159 | B2 * | 7/2013 | Stanfill ...................... G06F 8/51 |
| | | | 707/609 |
| 8,656,364 | B1 | 2/2014 | Kolawa et al. |
| 2001/0037492 | A1 | 11/2001 | Holzmann |
| 2002/0144236 | A1 | 10/2002 | Beer et al. |
| 2002/0188594 | A1 | 12/2002 | Kulp et al. |
| 2003/0106049 | A1 | 6/2003 | Ungar |
| 2004/0117772 | A1 | 6/2004 | Brand et al. |
| 2005/0166194 | A1 | 7/2005 | Rubin et al. |
| 2005/0198597 | A1 | 9/2005 | Zhu et al. |
| 2005/0229044 | A1 | 10/2005 | Ball |
| 2006/0150026 | A1 | 7/2006 | Kolawa et al. |
| 2006/0156128 | A1 | 7/2006 | Grinchuk et al. |
| 2006/0247907 | A1 | 11/2006 | Qadeer et al. |
| 2006/0294158 | A1 | 12/2006 | Tsyganskiy et al. |
| 2007/0022407 | A1 | 1/2007 | Givoni et al. |
| 2007/0168907 | A1 | 7/2007 | Iborra et al. |
| 2007/0168927 | A1 | 7/2007 | Campbell et al. |
| 2007/0168988 | A1 | 7/2007 | Eisner et al. |
| 2007/0169018 | A1 * | 7/2007 | Coward ...................... G06F 8/51 |
| | | | 717/136 |
| 2007/0169019 | A1 | 7/2007 | Leino et al. |
| 2007/0266366 | A1 | 11/2007 | Bucuvalas |
| 2007/0294655 | A1 | 12/2007 | Campos et al. |
| 2008/0066030 | A1 | 3/2008 | Hekmatpour et al. |
| 2009/0070158 | A1 | 3/2009 | Virine et al. |
| 2009/0119624 | A1 | 5/2009 | Chess et al. |
| 2009/0326906 | A1 | 12/2009 | Matsuda et al. |
| 2010/0023931 | A1 | 1/2010 | Cheng et al. |
| 2010/0229150 | A1 | 9/2010 | Stone et al. |
| 2010/0313179 | A1 | 12/2010 | Groves et al. |
| 2011/0055803 | A1 | 3/2011 | Abadi et al. |
| 2011/0107313 | A1 | 5/2011 | Baron |
| 2011/0138362 | A1 | 6/2011 | Keidar-Banner et al. |
| 2011/0145799 | A1 | 6/2011 | Bartolomeo |
| 2011/0283260 | A1 | 11/2011 | Bucuvalas |
| 2013/0125098 | A1 | 5/2013 | Dhoolia et al. |
| 2015/0135166 | A1 | 3/2015 | Tarlow et al. |
| 2016/0092177 | A1 * | 3/2016 | Geng ........................ G06F 8/35 |
| | | | 717/104 |
| 2016/0170859 | A1 | 6/2016 | Bucuvaias |
| 2016/0291942 | A1 * | 10/2016 | Hutchison ............... G06F 8/451 |
| 2017/0116396 | A1 * | 4/2017 | Gu ........................ G06F 21/125 |

OTHER PUBLICATIONS

Bucuvalas, Steve et al. "Computation Platform" Technical Report; ioSemantics, 2015.
Bucuvalas, Steve et al. "Data Ordered Behavior" Technical Report; ioSemantics, 2015.
Bucuvalas, Steve et al. "Data Ordered Behavior Normalization and Application" Technical Report; ioSemantics, Apr. 2015.
Bucavalas, Steve et al, "Dependency Ordered Behavior Representations—Dob Paper" Technical Report; ioSemantics; 2015.
Bucuvalas, Steve et al. "Language Definition of the Simple Imperative Language" Technical Report, ioSemantics; 2015.
Dhama, Harpal "Quantitative Models of Cohesion and Coupling in Software" J. Systems Software, vol. 29, Issue 1; Apr. 1995; pp. 65-74 (10 pages).
Fechete, Raul et al. "Generating Control Flow Graphs for Ada Programs" Projektbericht Nr. 183/1-139; Sep. 2007 (48 pages).
GCC Compiler Source Code "Control Flow Functions for Trees" Copyright 2001; available at http://www.opensource.apple.com/source/gcc/gcc-1765/gcc/tree-cfg.c (97 pages).
Goldblatt, Robert "Topoi: The Categorial Analysis of Logic" Mineola, NY; Dover Publications; 2006 (299 pages).
Hopcroft, John E., et al "Introduction of Automata Theory, Languages, and Computation" Addison Wesley, 2006 (254 pages).
Rajlich, Vaclav "Software Engineering: The Current Practice" CRC Press; 2011 (160 pages).
Suri, R.P. "Introduction to Prolog" Alpha Science International Ltd.; 2007 (151 pages).
Gnome Developer "A Language Definition for the C Language" Technical Report 2014.
Wikipedia Emulator, Apr. 2014.
Wikipedia, Hardware Emulation; Oct. 2014.
Winskel, G. "The Formal Semantics of Programming Languages: An Introduction" MIT, 1993 (193 pages).
International Preliminary Report on Patentability for PCT Application No. PCT/US2016/031882, dated Nov. 23, 2017.
Aho Alfred et al. "Compilers: Principles, Techniques, and Tools" Second Edition; Pearson / Addison Wesley, 2nd edition, 2006 (805 Pages).
Allen, Frances "Control Flow Analysis" In Proceedings of a Symposium on Compiler Optimization; pp. 1-19; 1970.
Ball, Thomas "The Concept of Dynamic Analysis" In Proceeding ESEC/FSE-7 Proceedings of the 7th European Software Engineering Conference Held Jointly with the 7th ACM SIGSOFT International Symposium on Foundations of Sofware Engineering; 1999.
Ben-Ari, M "Mathematical Logic for Computer Science" Third Edition, Spring 3rd Edition 2012 (364 pages).
Collard, Jean-Francois "Reasoning About Program Transformations: Imperative Programming and Flow of Data" Springer, 2010 (258 pages).
Cooper, Keith et al. "Engineering a Compiler" Second Edition; Morgan Kaufmann, 2011 (825 pages).
Cousot, Patrick et al. "Modular Static Program Analysis" In 11th International Conference on Compiler Construction; pp. 159-178, 2002.
Cytron, Ron et al. "An Efficient Method of Computing Static Single Assignment Form" In Proceeding POPL '89 Proceedings of the 16th ACM SIGPLAN-SIGACT Symposium on Principles of Programming Languages; pp. 25-35; 1989.
Gosling, James et al. "The Java Language Specification: Java SE 8 edition" Feb. 2015 (788 Pages).
Hudak, Paul "Conception, Evolution, and Application of Functional Programming Languages" ACM Computing Surveys; 21:359-411; 1989.
King, James C. "Symbolic Execution and Program Testing" Communications of the ACM; 19:385-394; 1976.
Kroening, Daniel et al. "Decision Procedures, An Algorithmic Point of View" Journal of Automated Reasoning Manuscript; Springer-Verlag; 2008.
Lee, Sang-Ik et al. "Cetus—An Extensible Compiler Infrastructure for Source-to-Source Transformation" Languages and Compilers for Parallel Computing; Springer-Verlag, Berlin/Heidelberg, May 14, 2004.

(56) References Cited

OTHER PUBLICATIONS

Lewis, Harry et al. "Elements of the Theory of Computation" Prentice-Hall; 2nd Edition; 1997 (375 pages).
Manna, Zohar et al. "Temporal Verification of Reactive Systems: Safety" Springer; 1995 (265 pages).
Scott, Dana "Outline of a Mathematical Theory of Computation" In Proceedings of the 4th Princeton Conference on Information Science and Systems; 1970.
Shilov, Georgi E. "Linear Algebra" Translated and Edited by Richard A. Silverman ed.; Dover Publications; 1977 (399 pages).
International Search Report for PCT Application No. PCT/US2016/031882, dated Aug. 12, 2016.
Written Opinion for PCT Application No. PCT/US2016/031882, dated Aug. 12, 2016.
Harrold, Mary Jean et al. "Representation and Analysis of Software" Available at: www.-ics.-uci.-edu/-~lopes/-teaching/-inf212W12/-readings/-rep--analysis--soft.-pdf; 2002.
Phase Change Software "Application Functions" Feb. 29, 2016.
"Static Single Assignment Form" Available at http://pages.cs.wisc.edu/~fischer/cs701.f08/lectures/Lecture23.4up.pdf; Fall 2008.
Abraham et al., "AutoTest: A Tool for Automatic Test Case Generation in Spreadsheets," Proceedings of the 2006 IEEE Symposium on Visual Languages and Human-Centric Computing (VLHCC 2006), IEEE Computer Society, Washington, DC, pp. 43-50.
Abraham et al., "Goal-directed debugging of spreadsheets," Proceedings of the 2005 IEEE Symposium on Visual Languages and Human Centric Computing (VLHCC 2005), IEEE Computer Society, Washington, DC, 2005, pp. 37-44.
Abraham et al., "Header and Unit Inference for Spreadsheets Through Spatial Analyses," Proceedings of the 2004 IEEE Symposium on Visual Languages and Human Centric Computing, the Computer Society, Washington, DC, 2004, pp. 165-172.
"Abstract Interpretation" Wikipedia, The Free Encyclopedia, available at http://en.wikipedia.org/wiki/Abstract_interpretation, printed on Feb. 1, 2011, 5 pages.
Aho et al., Compilers, Principles, Techniques and Tools, Bell Telephone Laboratories, Inc., 1986, pp. 1-796.
Anand, Saswat et al. "Symbolic Execution with Abstract Subsumption Checking" SPIN '06 Proceedings of the 13th International Conference on Model Checking Software, pp. 163-181, Springer-Verlag Berlin, Heidelberg, copyright 2006.
Anderson et al., "Modeling Software Systems with Decidable Semantics: Implications on Software Quality Assurance," Proceedings of the 2008 International Conference on Software Engineering Research & Practice, ICSE 2008, available at http://www.iosemantics.com/academic_papers/ioRules.pdf, 10 pages.
Baader et al., eds., The Description Logic Handbook: Theory, Implementation, and Applications, Cambridge University Press, Cambridge, UK, 2003, pp. 1-601.
Baader et al., "Description Logics with Aggregates and Concrete Domains," Information Systems, 2003, vol. 28(8), pp. 979-1004.
Baader et al., "Description logics with concrete domains and aggregation," Proceedings of the Thirteenth European Conference on Artificial Intelligence (ECAI-98), Brighton, Aug. 23-28, 1998, 5 pages.
Baader et al., "Fusions of Description Logics," 2000, Description Logics, pp. 1-10.
Baader et al., "Tableau Algorithms for Description Logics," Proceedings of the International Conference on Automated Reasoning with Tableaux and Related Methods, Tableaux 2000, vol. 1847, St Andrews, Scotland, UK, pp. 1-16.
Berners-Lee, Tim "Weaving the Web: The Original Design and Ultimate Desitny of the World Wide Web by its Inventor" Harper Collins, 1999, 231 pages.
Bik, Aart J.C., et al. "Implementation of Fourier-Motzkin Elimination" 1995.
Binkley, "Source Code Analysis: A Road Map," Proceedings of the Future of Software Engineering (FOSE '07), IEEE Computer Society, Washington, DC, USA, 15 pages.
Brachman et al., Knowledge Representation and Reasoning, Morgan Kaufmann, 2004, pp. 1-381.
Bradley et al., The Calculus of Computation: Decision Procedures with Applications to Verification, Springer Verlag, Berlin, Heidelberg, 2007, pp. 1-366.
Brooks, The Mythical Man-Month: Essays on Software Engineering (20th Anniversary Edition), 1995, Addison-Wesley, pp. 1-322.
Bruno, Model-Based Software Engineering, Chapman & Hall, London, 1995, pp. 1-259.
Bucuvalas, "Beyond Model Checking: ioSemantics," ioSemantics White Paper, May 2008, 8 pages.
Bucuvalas et al., "Introduction to ioSemantics," ioSemantics LLC, Mar. 2008, available at http://www.iosemantics.com/academic_papers/ioSemantics_Introduction.pdf, 13 pages.
Bucuvalas et al., "Model-driven quality assurance for end users," Proceedings of the IEEE Symposium on Visual Languages and Human-Centric Computing, (VLHCC '07) 2007, available at http://www.iosemantics.com/academic_papers/VLHCC_ioSemantics.pdf, 8 pages.
Bucuvalas et al., "Push-Button Verification and Debugging for COBOL-based Financial Systems," Proceedings of the 13th IASTED International Conference, Software Engineering and Applications, Nov. 2-4, 2009, pp. 148-157.
Burnett et al., "End-user software engineering with assertions in the spreadsheet paradigm," Proceedings of the 25th International Conference on Software Engineering, Portland Oregon, May 3-10, 2003, IEEE Computer Society, Washington, DC, 2003, pp. 93-103.
Burnett et al., "End-User Software Engineering," Communications of ACM, Sep. 2004, vol. 47(9), pp. 53-58.
Buttle, "Verification of Compiled Code," Ph.D. Thesis, Department of Computer Science, University of York, Jan. 2001, pp. 1-262.
Christensen, Soren et al. "Decidable Subsets of CCS" Comput. J., vol. 37, pp. 233-242.
Cimatti et al., "NuSMV: A New Symbolic Model Verifier," Lecture Notes in Computer Science, 1999, vol. 1633, pp. 495-499.
Clarke, E.M., et al. "Automatic Verification of Finite-State Concurrent Systems Using Temporal Logic Specifications" ACM Transactions on Programming Languages and Systems, vol. 8, No. 2, Apr. 1986, pp. 244-263.
Clement, Romain J.G., et al. "Collective Cognition in Humans: Groups Outperform their Best Members in a Sentence Reconstruction Task" PLOS ONE; Oct. 2013, vol. 8, Issue 10, e77943.
Corbett, James C. et al. "Bandera: Extracting Finite-State Models from Java Source Code" Proceedings of the 2000 International Conference on Software Engineering, 2000, pp. 439-448.
Dam, Mads "Decidability and Proof Systems for Language-Based Non-Interference Relations", 2006, POPL '06 ACM SIGPLANSIGACT Symposium on Principles of Programming Languages, pp. 67-78.
De Marneffe, Marie-Catherine et al. "The Stanford Typed Dependencies Representation" In Workshop COLING, 2008.
Desovski, Dejan et al. "A Component-Based Approach to Verification and Validation of Formal Software Models" copyright Springer-Verlag Berlin Heidelberg, 2007.
Dwyer, Matthew B., et al. "Tool-Supported Program Abstraction for Finite-State Verification" Proceedings of the 23rd International Conference on Software Engineering, 2001, pp. 177-187.
Fisher et al., "Automated test case generation for spreadsheets," Proceedings of the 24th International Conference on Software Engineering, Orlando, Florida, May 19-25, 2002, ACM Press, NY, pp. 141-151.
Fisher et al., "Integrating automated test generation into the WYSIWYT spreadsheet testing methodology," ACM Trans. Softw. Eng. Methodol, vol. 15(2) Apr. 2006, pp. 150-194.
Fletcher, Practical Methods of Optimization, Second Edition, John Wiley & Sons, 2000, pp. 1-436.
Foucault, Matthieu et al. "Impact of Developer Turnover on Quality in Open-Source Software" In Proc. of the 10th FSE, pp. 829-841. ACM, 2015.
Gallagher et al., "Program Slicing," Frontiers of Software Maintenance, Sep.-Oct. 2008, Beijing, China, 10 pages.
Gallier, Logic for Computer Science: Foundations of Automatic Theorem Proving, Jun. 2003, Harper & Row Publishers, Inc., pp. 1-511.

(56) References Cited

OTHER PUBLICATIONS

Gallier, Logic for Computer Science: Foundations of Automatic Theorem Proving, 1986, Harper & Row Publishers, Inc., pp. 1-511.
Gibbs, "Software's Chronic Crisis," Scientific American, Sep. 1994, pp. 86-95.
Glass, "Buzzwordism and the Epic 50 Million Software Debacle," Communications of the ACM, Aug. 1999, vol. 42(8), pp. 17-19.
Graves et al., "An empirical study of regression test selection techniques," ACM Transactions on Software Engineering Methodologies, 2001, vol. 10(2), pp. 184-208.
Herman, W3C Semantic Web Activity, Sep. 2007, available at http://www.w3.org/2001/sw/, 5 pages.
Hirschberg, Julia et al. "Advances in Natural Language Processing" Science, vol. 349, Issue 6245, pp. 261-266, Jul. 17, 2015.
Hofstadter, Douglas R et al. "Surfaces and Essences: Analogy as the Fuel and Fire of Thinking" Basic Books, 2013.
Holzmann, Gerard J. "The Model Checker Spin" IEEE Transactions on Software Engineering, vol. 23, No. 5, May 1997.
IoSemantics White Paper, "Exploring the Difference," Feb. 2008, 17 pages.
"Interpretation (Logic)" Wikipedia, The Free Encyclopedia, printed Feb. 1, 2011 available at http://en.wikipedia.org/wiki/Interpretation_(logic), 9 pages.
Jackson, "Dependable Software by Design," Scientific American, Jun. 2006, pp. 68-75.
Jackson, "Analysis," Chapter 5 of Software Abstractions: Logic, Language, and Analysis, 2006, MIT Press, pp. 139-167.
Jansen, Bernard J. et al. "A Temporal Comparison of AltaVista Web Searching" Journal of the American Society for Information Science and Technology, 56(6):559-570, 2005.
Jones, C., Applied Software Measurement: Assuring Productivity and Quality, Second Edition, McGraw-Hill, 1996, pp. 1-518.
Kahneman, Daniel "Thinking, Fast and Slow" Farrar, Straus and Giroux, 2015.
Kicillof, Nicolas et al. "Achieving Both Model and Code Coverage with Automated Gray-Box Testing" AMOST'07, Jul. 9-12, 2007, London, UK.
Kiesel, Andrea et al. "Mechanisms of Subliminal Response Priming" Advances in Cognitive Psychology, 3(1-2):307, 2007.
Klein, Dan et al. "Fast Exact Inference with a Factored Model for Natural Language Parsing" In Proc. 15th NIPS, pp. 3-10, 2002.
Ko et al., "Designing the whyline: a debugging interface for asking questions about program behavior," Proceedings of the SIGCHI Conference on Human Factors in Computing Systems, Vienna, Austria, Apr. 24-29, 2004, vol. 6(1), ACM Press, NY, pp. 151-158.
Kozen, Automata and Computability, Springer, New York, NY, USA, 1997, pp. 1-400.
Kuhn, Thomas S. "The Structure of Scientific Revolutions" Chicago: University of Chicago Press, 1962.
Lewis et al., "Uncomputability," Chapter 6 of Elements of a Theory of Computation, New Jersey, Prentice-Hall, 1981, pp. 272-310.
Lutz, "Description Logics with Concrete Domains: A Survey," Chapter 13 of Advances in Modal Logic, vol. 4, (P. Balbiani et al., eds.), King's College Publications, 2003, pp. 265-296.
Maalej, Walid et al. "On the Comprehension of Program Comprehension" ACM Transactions on Embedded Computing Systems, vol. 9, No. 4, Mar. 2014.
Manna, Mathematical Theory of Computation, Dover Publications, 2003, (originally published by McGrawhill, 1974), pp. 1-448.
Marriott et al., Programming with Constraints: An Introduction, MIT Press, Cambridge, Mass, 1998, pp. 1-467.
Miller, George A. "WordNet: A Lexical Database for English" Communications of the ACM, 38(11):39-41, 1995.
Minelli, Roberto et al. "I Know What You Did Last Summer: An Investigation of How Developers Spend Their Time" In Proc. of the 23rd ICPC, pp. 25-35. IEEE Press, 2015.
Mitchell, "Decision Tree Learning," Chapter 3 of Machine Learning, McGraw Hill, 1997, pp. 52-80.

Myers et al., "Invited research overview: end-user programming," In CHI 2006 Extended Abstracts on Human Factors in Computing Systems, Montréal, Québec, Canada, Apr. 22-27, 2006, ACM Press, NY, pp. 75-80.
Neate, "An Object-Oriented Semantic model for .NET," Honours Report, University of Canterburry, Department of Computer Science and Software Engineering, Nov. 2005, 47 pages.
Nielsen, Jakob "Ten Usability Heuristics" http://www.useit.com/papers/heuristic/heuristic_list.html; 2006.
Nielson et al., Principles of Program Analysis, Springer, Berlin, Germany, 2005, pp. 1-452.
Nielson et al., Principles of Program Analysis, Springer-Verlag, Berlin, Germany, 1999, pp. 1-452.
Pearl, Judea "Causality: Models, Reasoning, and Inference" Cambridge University Press, 2000.
"Primitive Recursion Function," Wikipedia, The Free Encyclopedia, available at http://en.wikipedia.org/wiki/Primitive_recursion, printed on Feb. 1, 2011, 9 pages.
"Rational Robot," IBM, available at http://www-306.ibm.com/software/awdtools/tester/robot/, printed Jul. 10, 2007, 1 page.
Reps, Thomas et al. "Precise Interprocedural Dataflow Analysis Via Graph Reachability" University of Wisconsin, copyright 2005 by ACM.
Resnick, Paul et al. "Recommender Systems" Communications of the ACM, 40(3):56-58, 1997.
Reubenstein et al., "Separating Parsing and Analysis in Reverse Engineering Tools," Proceedings of Working Conference on Reverse Engineering 1993, May 1993, pp. 117-125.
"Rice's Theorem," Wikipedia, available at http://en.wikipedia.org/wiki/Rice's_theorem, printed Jul. 16, 2007, 4 pages.
Rigby, Peter C. et al. "Quantifying and Mitigating Turnover-Induced Knowledge Loss: Case Studies of Chrome and a Project at Avaya" In Proc. of the 38th ICSE, pp. 1006-1016. ACM, 2016.
Rothermel et al., "A methodology for testing spreadsheets," ACM Trans. Softw. Eng. Methodol., vol. 10(1), Jan. 2001, pp. 110-147.
Rothermel et al., "WYSIWYT testing in the spreadsheet paradigm: An empirical evaluation," Proceedings of the 22nd International Conference on Software Engineering, Limerick, Ireland, Jun. 4-11, 2000, (ICSE '00), ACM Press, New York, NY, pp. 230-239.
Russell, Stuart J. et al. "Artificial Intelligence. A Modern Approach" Prentice-Hall, Third Edition, 1995.
Saraswat, Vijay A., et al. "Semantic Foundations of Concurrent Constraint Programming", ACM, 1990, pp. 333-352.
Sharir et al. "Two Approaches to Interprocedural Data Flow Analysis" Computer Science Department—Technical Report; New York University, Sep. 1978.
Schwartzbach, "Lecture Notes on Static Analysis," Wikipedia, The Free Encyclopedia, undated, available at http://lara.epfl.ch/dokuwiki/_media/sav08:schwartzbach.pdf, pp. 1-58.
"Semantic Technology," Wikipedia: The Free Encyclopedia, Dec. 1, 2008, accessed via Internet archives at hftp://en.wikipedia.org/wiki/Semantic_technology, 2 pages.
Sen, Mainak et al. "Design and Synthesis of Image Processing Systems Using Reconfigurable Data Flow Graphs" Department of Electrical and Computer Engineering, and Institute for Advanced Computer Studies, University of Maryland at College Park, Nov. 22, 2005.
Sims, et al. "Automated Validation of Software Models" Proceedings of the 16th IEEE International Conference on Automated Software Engineering, 2001.
Sipser, M., Introduction to the Theory of Computation, PWS Publishing Company, 1997, pp. 1-396.
Smith et al., "OWL Web Ontology Language Guide," 2004, available at http://www.w3.org/TR/owl-guide/, printed Jul. 10, 2007, pp. 1-49
Stirling, "Decidability of DPDA Equivalence," Tech. Report LFCS-99-411, University of Edinburgh, 1999, pp. 1-25.
Vardi, "Why is Modal Logic So Robustly Decidable?" In Descriptive Complexity and Finite Models, (N. Immerman et al., eds.), Providence, RI, American Mathematical Society, 1997, pp. 1-28.
Visser, Willem, et al. "Model Checking Programs" The Fifteenth IEEE International Conference Automated Software Engineering, 2000, pp. 3-11.

(56) References Cited

OTHER PUBLICATIONS

Wikipedia "Compiler-Compiler" as downloaded from http://en.wikipedia.org/wiki/Compiler-compiler. On Sep. 5, 2013.
Wkipedia "Physical Symbol System" Wikipedia, Wikimedia Foundation, en.wikipedia.org/wiki/Physical_symbol_system; Accessed Aug. 7, 2018.
Xu, Anbang, et al. "A New Chatbot for Customer Service on Social Media" In Proc. of the CHI, pp. 3506-3510. ACM, 2017.
International Search Report for International (PCT) Patent Application No. PCT/US2007/065453, dated Oct. 1, 2008.
Written Opinion for International (PCT) Patent Application No. PCT/US2007/065453, dated Oct. 1, 2008.
International Preliminary Report on Patentability for International (PCT) Patent Application No. PCT/US2007/065453, dated Nov. 27, 2008.
International Search Report for PCT Application No. PCT/US2008/074740, dated Nov. 12, 2008.
Written Opinion for PCT Application No. PCT/US2008/074740, dated Nov. 12, 2008.
International Preliminary Report on Patentability for PCT Application No. PCT/US2008/074740, dated Mar. 11, 2010.
Supplementary Search Report for European Patent Application No. 08828603, dated Dec. 6, 2011.
Communication Pursuant to Rules 70(2) and 70a(2) EPC for European Patent Application No. 08828603, dated Dec. 23, 2011.
Official Action for European Patent Application No. 08828603.4, dated Mar. 7, 2013.
Summons to Attend Oral Proceedings Pursuant to Rule 115(1) EPC for European Patent Application No. 08828603.4, dated Jun. 16, 2015.
European Search Report for European Patent Application No. 16020007.7, dated Apr. 28, 2016.
Office Action for European Patent Application No. 16020007.7, dated Oct. 22, 2018.
International Search Report for International Application No. PCT/US2018/030395, dated Aug. 6, 2018.
Written Opinion for International Application No. PCT/US2018/030395, dated Aug. 6, 2018.
Official Action (Restriction Requirement) for U.S. Appl. No. 11/693,491, dated Mar. 12, 2012.
Official Action for U.S. Appl. No. 11/693,491, dated Jul. 20, 2012.
Official Action for U.S. Appl. No. 11/693,491, dated Apr. 9, 2013.
Official Action for U.S. Appl. No. 11/693,491, dated Sep. 10, 2013.
Official Action for U.S. Appl. No. 11/693,491, dated Apr. 15, 2014.
Official Action for U.S. Appl. No. 11/693,491, dated Dec. 23, 2014.
Official Action for U.S. Appl. No. 11/693,491, dated Aug. 17, 2015.
Official Action for U.S. Appl. No. 15/044,728, dated Nov. 2, 2017.
Official Action for U.S. Appl. No. 15/044,728, dated Aug. 9, 2018.
Official Action for U.S. Appl. No. 12/675,198, dated Oct. 12, 2012.
Official Action for U.S. Appl. No. 12/675,198, dated Apr. 19, 2013.
Official Action for U.S. Appl. No. 12/675,198, dated Jun. 10, 2014.
Anderson, Lorin W., et al. "A Taxonomy for Learning, Teaching and Assessing: A Revision of Bloom's Taxonomy of Educational Objectives" Pearson Education Limited 2014 (328 pages).
Artz, Alice F. et al. "Development of a Cognitive-Metacognitive Framework for Protocol Analysis of Mathematical Problem Solving in Small Groups" Cognition and Instruction, 9(2):137-175, DOI: 10.1207/s1532690xci0902_3, 1992.
Davey, B. A. et al. "Introduction to Lattices and Order, 2nd Edition" Cambridge University Press, 2012 (158 pages).
Domingos, Pedro "The Master Algorithm: How the Quest for the Ultimate Learning Machine Will Remake Our World" Basic Books, 2015; 179 pages.
Ensmenger, Nathan L. "The Computer Boys Take Over: Computers, Programmers, and the Politics of Technical Expertise" The MIT Press 2010 (169 pages).
Hearst, Marti "Search User Interfaces" Cambridge University Press, 2009 (385 pages).
IEEE 100 "The Authoritative Dictionary of IEEE Standards Terms" 7th Edition; Published by Standards Information Network IEEE Press; 2000, p. 314.
Johnson-Laird, Philip "How We Reason" Oxford University Press, 2008; 295 pages.
Klein, Richard G, et al. "The Dawn of Human Culture: A Bold New Theory on What Sparked the "Big Bang" of Human Consciousness" Wiley, 2002 (289 pages).
Koller, Daphne et al. "Probabilistic Graphical Models Principles and Techniques" MIT Press, 2009 (1270 pages).
Kurzweil, Ray "How to Create a Mind: The Secret of Human Thought Revealed" Penguin Books, 2012 (178 pages).
Lawvere, F. William et al., "Conceptual Mathematics: A First Introduction to Categories, 2nd Edition" Cambridge University Press, 2009 (403 pages).
Marshack, Alexander "The Roots of Civilization" Moyer Bell Limited, 1991; 224 pages.
Le, Quoc and Thomas, Mikolov "Distributed Representations of Sentences and Documents" Proceedings of the 31st International Conference on Machine Learning, Beijing, China, 2014, JMLR: W&CP, vol. 32 (9 pages).
Page, Scott E. "The Difference: How the Power of Diversity Creates Better Groups, Firms, Schools, and Societies" Princeton, NJ: Princeton University Press, 2007; 229 pages.
Sloman, Steven "Casual Models: How People Think about the World and Its Alternatives" Oxford University Press, 2005 (116 pages).
Sloman, Steven et al. "The Knowledge Illusion: Why We Never Think Alone" Penguin USA, 2017 (155 pages).
Official Action for U.S. Appl. No. 15/044,728, dated Mar. 4, 2019.

\* cited by examiner

```
┌─ 102
│ i=6
│ j=1
│ k=1
│ repeat
│         if (i==6):
│                 k=0
│         else:
│                 i=i+1
│         i=i+k
│         j=j+1
│ until (i==j)
└─
```

*Fig. 1A*

```
┌─ 104
│ i(1)=6
│ j(1)=1
│ k(1)=1
│ repeat
│         i(2)=φ(i(1),i(5))
│         j(2)=φ(j(1),j(3))
│         k(2)=φ(k(1),k(4))
│         if (i(2) ==6):
│                 k(3)=0
│         else:
│                 i(3)=i(2)+1
│         i(4)=φ(i(2),i(3))
│         k(4)=φ(k(3),k(2))
│         i(5)=i(4)+k(4)
│         j(3)=j(2)+1
│ until (i(5) ==j(3))
└─
```

*Fig. 1B*

CFG

COB

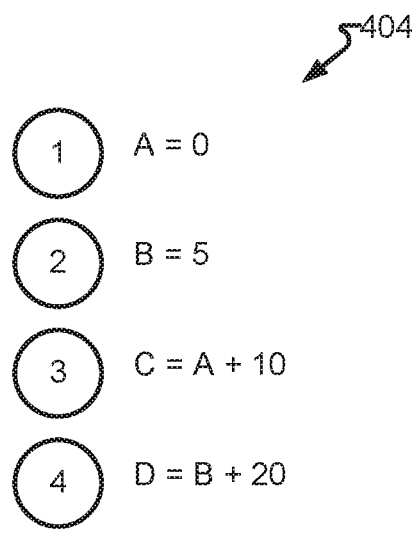
*FIG. 4A*
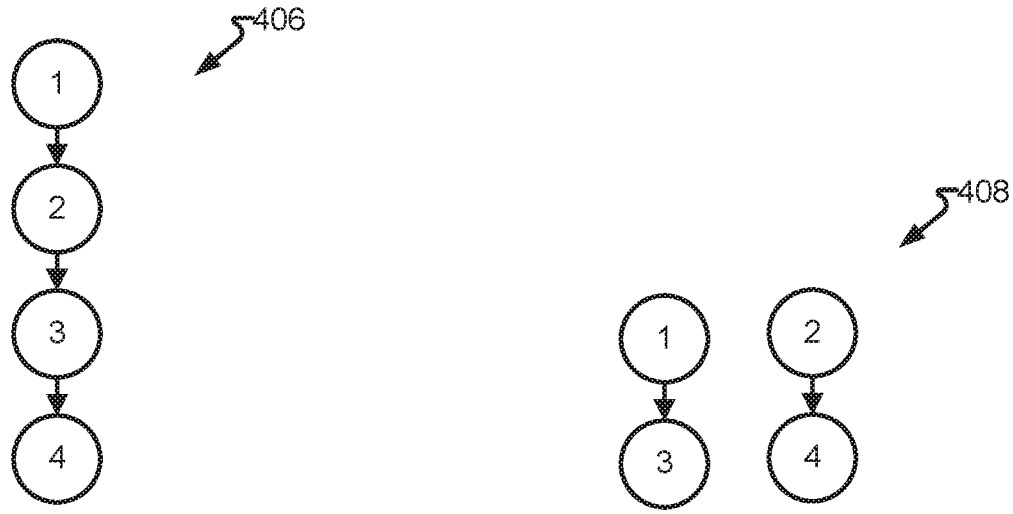
*FIG. 4B*  *FIG. 4C*

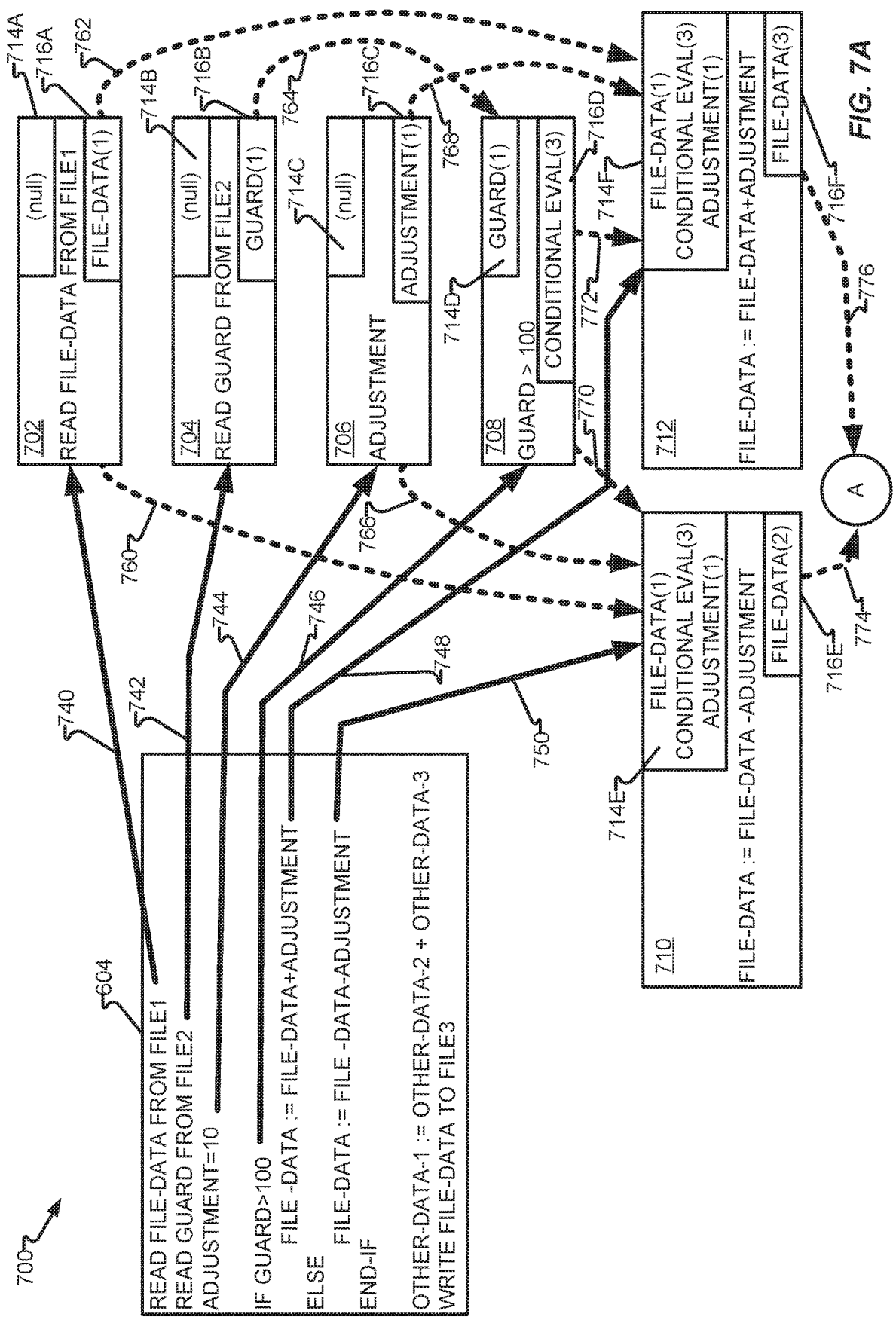

```
// AREA OF A TRIANGLE - HERON'S FORMULA
START;
{
    INTEGER A, B, C, S, AREA;
    CONSOLE_OUTPUT("Enter first value: ");
    CONSOLE_INPUT(value(A));
    CONSOLE_OUTPUT("Enter second value: ");
    CONSOLE_INPUT(value(B));
    CONSOLE_OUTPUT("Enter third value: ");
    CONSOLE_INPUT(value(C));
    TEST(ALL(A=0, B=0, C=0)
        IF_TRUE(CONSOLE_OUTPUT(
            "area = zero");
        IF_FALSE(return());
    TEST(OR(A=0, B=0, C=0)
        IF_TRUE(CONSOLE_OUTPUT
            ("ERROR:Cannot have zero dimensions");
        IF_FALSE(return());
    S = (A + B + C) / 2.0;
    AREA = SQRT( S * (S - A) * (S - B) * (S - C) )
    CONSOLE_OUTPUT("Area is: ",AREA(FORMAT(int));
END;
}
```

⌐1206

```
// AREA OF A TRIANGLE - HERON'S FORMULA
include <iostream> int main()
{
    int A, B, C, S, AREA;
    cout << "Enter first value: ";
    cin >> A;
    cout << "Enter second value: ";
    cin >> B;
    count << "Enter third value: ";
    cin << c;
    if (AND(A==0, B==0, C==0))
    {
        cout << "Area = zero";
    }
    if (OR A==0, B==0, C==0))
    {
        cout << "ERROR: Cannot have zero dimensions".
    }
    S = (A + B + C) / 2.0;
    AREA = SQRT( S * (S - A) * (S - B) * (S - C));
    count << "Area is: " << AREA << ".\n";
    return 0;
}
```

```
IDENTIFICATION DIVISION.
   PROGRAM-ID. PATENT-EXAMPLE.
   ENVIRONMENT DIVISION.
   CONFIGURATION SECTION.
   SOURCE-COMPUTER. IBM-PC.
   OBJECT-COMPUTER. IBM-PC.
   DATA DIVISION.
   WORKING-STORAGE SECTION.
   01 FILENAME    PIC X.
   01 FILE-KEY    PIC X.
   01 STATUS-VAR  PIC X.
   01 FILE-DATA   PIC X.
   01 GUARD       PIC X.
   01 ADJUSTMENT  PIC X.
   PROCEDURE DIVISION.
   PATENT-EXAMPLE-START.
      MOVE "file1" TO FILENAME
      MOVE "data" TO FILE-KEY

READ FILENAME INTO FILE-DATA
         KEY IS FILE-KEY
         STATUS STATUS-VAR

MOVE "file2" TO FILENAME
      MOVE "guard" TO FILE-KEY

READ FILENAME INTO GUARD
         KEY IS FILE-KEY
         STATUS STATUS-VAR

MOVE 10 TO ADJUSTMENT

IF GUARD > 100
         ADD ADJUSTMENT TO FILE-DATA
      ELSE
         SUBTRACT ADJUSTMENT FROM FILE-DATA
      END-IF

MOVE "file3" TO FILENAME
      MOVE "write" TO FILE-KEY
      WRITE FILENAME FROM FILE-DATA
         KEY IS FILE-KEY
         STATUS STATUS-VAR

STOP RUN.
```

*FIG. 14*

```
cfm('PATENT-EXAMPLE',controlFlowMachine).
cfm('PATENT-EXAMPLE',argSignature([])).
cfm('PATENT-EXAMPLE',moduleName('PATENT-EXAMPLE')).
cfm('PATENT-EXAMPLE',moduleType(cfm)).
cfm('PATENT-EXAMPLE',resultSignature([])).
cfm('PATENT-EXAMPLE',piFunc(funcId1,'PATENT-EXAMPLE_node_1')).
cfm('PATENT-EXAMPLE',piFunc(funcId1,'PATENT-EXAMPLE_node_10')).
cfm('PATENT-EXAMPLE',piFunc(funcId1,'PATENT-EXAMPLE_node_11')).
cfm('PATENT-EXAMPLE',piFunc(funcId1,'PATENT-EXAMPLE_node_2')).
cfm('PATENT-EXAMPLE',piFunc(funcId1,'PATENT-EXAMPLE_node_3')).
cfm('PATENT-EXAMPLE',piFunc(funcId1,'PATENT-EXAMPLE_node_4')).
cfm('PATENT-EXAMPLE',piFunc(funcId1,'PATENT-EXAMPLE_node_5')).
cfm('PATENT-EXAMPLE',piFunc(funcId1,'PATENT-EXAMPLE_node_6')).
cfm('PATENT-EXAMPLE',piFunc(funcId1,'PATENT-EXAMPLE_node_7')).
cfm('PATENT-EXAMPLE',piFunc(funcId1,'PATENT-EXAMPLE_node_8')).
cfm('PATENT-EXAMPLE',piFunc(funcId1,'PATENT-EXAMPLE_node_9')).
cfm('PATENT-EXAMPLE',piFunc(funcId2,'PATENT-EXAMPLE_node_12')).
cfm('PATENT-EXAMPLE',piFunc(funcId3,'PATENT-EXAMPLE_node_13')).
cfm('PATENT-EXAMPLE',piSource('PATENT-EXAMPLE_node_1',[17-11,17-35,'MOVE "file1" TO
FILENAME'])).
cfm('PATENT-EXAMPLE',piSource('PATENT-EXAMPLE_node_10',[40-11,40-35,'MOVE "write"
TO FILE-KEY'])).
cfm('PATENT-EXAMPLE',piSource('PATENT-EXAMPLE_node_11',[41-11,43-32,'WRITE
FILENAME FROM FILE-DATA    KEY IS FILE-KEY    STATUS STATUS-VAR'])).
cfm('PATENT-EXAMPLE',piSource('PATENT-EXAMPLE_node_12',[34-15,34-42,'ADD
ADJUSTMENT TO FILE-DATA'])).
cfm('PATENT-EXAMPLE',piSource('PATENT-EXAMPLE_node_13',[36-15,36-49,'SUBTRACT
ADJUSTMENT FROM FILE-DATA'])).
cfm('PATENT-EXAMPLE',piSource('PATENT-EXAMPLE_node_2',[18-11,18-34,'MOVE "data" TO
FILE-KEY'])).
cfm('PATENT-EXAMPLE',piSource('PATENT-EXAMPLE_node_3',[20-11,22-32,'READ FILENAME
INTO FILE-DATA    KEY IS FILE-KEY    STATUS STATUS-VAR'])).
cfm('PATENT-EXAMPLE',piSource('PATENT-EXAMPLE_node_4',[24-11,24-35,'MOVE "file2" TO
FILENAME'])).
cfm('PATENT-EXAMPLE',piSource('PATENT-EXAMPLE_node_5',[25-11,25-35,'MOVE "guard"
TO FILE-KEY'])).
cfm('PATENT-EXAMPLE',piSource('PATENT-EXAMPLE_node_6',[27-11,29-32,'READ FILENAME
INTO GUARD    KEY IS FILE-KEY    STATUS STATUS-VAR'])).
cfm('PATENT-EXAMPLE',piSource('PATENT-EXAMPLE_node_7',[31-11,31-32,'MOVE 10 TO
ADJUSTMENT'])).
cfm('PATENT-EXAMPLE',piSource('PATENT-EXAMPLE_node_8',[33-11,33-25,'IF GUARD >
100'])).
cfm('PATENT-EXAMPLE',piSource('PATENT-EXAMPLE_node_9',[39-11,39-35,'MOVE "file3" TO
FILENAME'])).
```

*FIG. 15A*

```
cfm('PATENT-EXAMPLE',piStmt('PATENT-
EXAMPLE_node_1',assign(instance(var('FILENAME'),'PATENT-
EXAMPLE_instance_2')=file1))).
cfm('PATENT-EXAMPLE',piStmt('PATENT-EXAMPLE_node_10',assign(instance(var('FILE-
KEY'),'PATENT-EXAMPLE_instance_6')=write))).
cfm('PATENT-EXAMPLE',piStmt('PATENT-
EXAMPLE_node_11',io(write(instance(var('FILENAME'),'PATENT-
EXAMPLE_instance_4'),instance(var('FILE-DATA'),'PATENT-
EXAMPLE_instance_5'),instance(var('FILE-KEY'),'PATENT-
EXAMPLE_instance_6'),instance(var('STATUS-VAR'),'PATENT-EXAMPLE_instance_3'))))).
cfm('PATENT-EXAMPLE',piStmt('PATENT-EXAMPLE_node_12',assign(instance(var('FILE-
DATA'),'PATENT-EXAMPLE_instance_7')=instance(var('FILE-DATA'),'PATENT-
EXAMPLE_instance_6')+instance(var('ADJUSTMENT'),'PATENT-EXAMPLE_instance_3')))).
cfm('PATENT-EXAMPLE',piStmt('PATENT-EXAMPLE_node_13',assign(instance(var('FILE-
DATA'),'PATENT-EXAMPLE_instance_9')=instance(var('FILE-DATA'),'PATENT-
EXAMPLE_instance_8')-instance(var('ADJUSTMENT'),'PATENT-EXAMPLE_instance_4')))).
cfm('PATENT-EXAMPLE',piStmt('PATENT-EXAMPLE_node_2',assign(instance(var('FILE-
KEY'),'PATENT-EXAMPLE_instance_2')=data))).
cfm('PATENT-EXAMPLE',piStmt('PATENT-
EXAMPLE_node_3',io(read(instance(var('FILENAME'),'PATENT-
EXAMPLE_instance_2'),instance(var('FILE-DATA'),'PATENT-
EXAMPLE_instance_2'),instance(var('FILE-KEY'),'PATENT-
EXAMPLE_instance_2'),instance(var('FILE-KEY'),'PATENT-
EXAMPLE_instance_3'),equal,instance(var('STATUS-VAR'),'PATENT-
EXAMPLE_instance_1'))))).
cfm('PATENT-EXAMPLE',piStmt('PATENT-
EXAMPLE_node_4',assign(instance(var('FILENAME'),'PATENT-
EXAMPLE_instance_3')=file2))).
cfm('PATENT-EXAMPLE',piStmt('PATENT-EXAMPLE_node_5',assign(instance(var('FILE-
KEY'),'PATENT-EXAMPLE_instance_4')=guard))).
cfm('PATENT-EXAMPLE',piStmt('PATENT-
EXAMPLE_node_6',io(read(instance(var('FILENAME'),'PATENT-
EXAMPLE_instance_3'),instance(var('GUARD'),'PATENT-
EXAMPLE_instance_2'),instance(var('FILE-KEY'),'PATENT-
EXAMPLE_instance_4'),instance(var('FILE-KEY'),'PATENT-
EXAMPLE_instance_5'),equal,instance(var('STATUS-VAR'),'PATENT-
EXAMPLE_instance_2'))))).
cfm('PATENT-EXAMPLE',piStmt('PATENT-
EXAMPLE_node_7',assign(instance(var('ADJUSTMENT'),'PATENT-
EXAMPLE_instance_2')=10))).
```

*FIG. 15B*

```
cfm('PATENT-EXAMPLE',piStmt('PATENT-
EXAMPLE_node_8',ifFunction(cond(instance(var('GUARD'),'PATENT-
EXAMPLE_instance_2')>100),function(funcId2,call1,[],[],[instance(var('ADJUSTMENT'),'PATENT
-EXAMPLE_instance_2'),instance(var('FILE-DATA'),'PATENT-
EXAMPLE_instance_2')],[instance(var('FILE-DATA'),'PATENT-
EXAMPLE_instance_3')]),function(funcId3,call2,[],[],[instance(var('ADJUSTMENT'),'PATENT-
EXAMPLE_instance_2'),instance(var('FILE-DATA'),'PATENT-
EXAMPLE_instance_2')],[instance(var('FILE-DATA'),'PATENT-
EXAMPLE_instance_4')]),phiFunctions([assign(instance(var('FILE-DATA'),'PATENT-
EXAMPLE_instance_5')=phi(instance(var('FILE-DATA'),'PATENT-
EXAMPLE_instance_3'),instance(var('FILE-DATA'),'PATENT-EXAMPLE_instance_4'))]))).
cfm('PATENT-EXAMPLE',piStmt('PATENT-
EXAMPLE_node_9',assign(instance(var('FILENAME'),'PATENT-EXAMPLE_instance_4')=file3))).
```

*FIG. 15C*

```
atomArc('PATENT-EXAMPLE_node_11', 'module(PATENT-EXAMPLE)-funcId1', 'module(PATENT-
EXAMPLE)-funcId1'-'PATENT-EXAMPLE_node_10', instance(var('FILE-KEY'),'PATENT-
EXAMPLE_instance_6'), []).
atomArc('PATENT-EXAMPLE_node_11', 'module(PATENT-EXAMPLE)-funcId1', 'module(PATENT-
EXAMPLE)-funcId1'-'PATENT-EXAMPLE_node_8', instance(var('FILE-DATA'),'PATENT-
EXAMPLE_instance_5'), [instance(var('GUARD'),'PATENT-EXAMPLE_instance_2'),instance(var('FILE-
DATA'),'PATENT-EXAMPLE_instance_3'),instance(var('FILE-DATA'),'PATENT-EXAMPLE_instance_4')]).
atomArc('PATENT-EXAMPLE_node_11', 'module(PATENT-EXAMPLE)-funcId1', 'module(PATENT-
EXAMPLE)-funcId1'-'PATENT-EXAMPLE_node_9', instance(var('FILENAME'),'PATENT-
EXAMPLE_instance_4'), []).
atomArc('PATENT-EXAMPLE_node_3', 'module(PATENT-EXAMPLE)-funcId1', 'module(PATENT-
EXAMPLE)-funcId1'-'PATENT-EXAMPLE_node_1', instance(var('FILENAME'),'PATENT-
EXAMPLE_instance_2'), []).
atomArc('PATENT-EXAMPLE_node_3', 'module(PATENT-EXAMPLE)-funcId1', 'module(PATENT-
EXAMPLE)-funcId1'-'PATENT-EXAMPLE_node_2', instance(var('FILE-KEY'),'PATENT-
EXAMPLE_instance_2'), []).
atomArc('PATENT-EXAMPLE_node_6', 'module(PATENT-EXAMPLE)-funcId1', 'module(PATENT-
EXAMPLE)-funcId1'-'PATENT-EXAMPLE_node_4', instance(var('FILENAME'),'PATENT-
EXAMPLE_instance_3'), []).
atomArc('PATENT-EXAMPLE_node_6', 'module(PATENT-EXAMPLE)-funcId1', 'module(PATENT-
EXAMPLE)-funcId1'-'PATENT-EXAMPLE_node_5', instance(var('FILE-KEY'),'PATENT-
EXAMPLE_instance_4'), []).
atomArc('PATENT-EXAMPLE_node_8', 'module(PATENT-EXAMPLE)-funcId1', 'module(PATENT-
EXAMPLE)-funcId1'-'PATENT-EXAMPLE_node_3', instance(var('FILE-DATA'),'PATENT-
EXAMPLE_instance_2'), [instance(var('FILE-KEY'),'PATENT-
EXAMPLE_instance_2'),instance(var('FILENAME'),'PATENT-EXAMPLE_instance_2')]).
atomArc('PATENT-EXAMPLE_node_8', 'module(PATENT-EXAMPLE)-funcId1', 'module(PATENT-
EXAMPLE)-funcId1'-'PATENT-EXAMPLE_node_6', instance(var('GUARD'),'PATENT-
EXAMPLE_instance_2'), [instance(var('FILE-KEY'),'PATENT-
EXAMPLE_instance_4'),instance(var('FILENAME'),'PATENT-EXAMPLE_instance_3')]).
atomArc('PATENT-EXAMPLE_node_8', 'module(PATENT-EXAMPLE)-funcId1', 'module(PATENT-
EXAMPLE)-funcId1'-'PATENT-EXAMPLE_node_7', instance(var('ADJUSTMENT'),'PATENT-
EXAMPLE_instance_2'), []).
atomArc('PATENT-EXAMPLE_node_8', 'module(PATENT-EXAMPLE)-funcId1', 'module(PATENT-
EXAMPLE)-funcId1'-'PATENT-EXAMPLE_node_8', instance(var('FILE-DATA'),'PATENT-
EXAMPLE_instance_3'), [pos(funcId2,0)]).
atomArc('PATENT-EXAMPLE_node_8', 'module(PATENT-EXAMPLE)-funcId1', 'module(PATENT-
EXAMPLE)-funcId1'-'PATENT-EXAMPLE_node_8', instance(var('FILE-DATA'),'PATENT-
EXAMPLE_instance_4'), [pos(funcId3,0)]).
atomArc('PATENT-EXAMPLE_node_8', 'module(PATENT-EXAMPLE)-funcId1', 'module(PATENT-
EXAMPLE)-funcId2-call1,module(PATENT-EXAMPLE)-funcId1'-signature('PATENT-EXAMPLE',funcId2),
pos(funcId2,0), [instance(var('FILE-DATA'),'PATENT-EXAMPLE_instance_7')]).
```

*FIG. 16A*

```
atomArc('PATENT-EXAMPLE_node_8', 'module(PATENT-EXAMPLE)-funcId1', 'module(PATENT-
EXAMPLE)-funcId3-call2,module(PATENT-EXAMPLE)-funcId1'-signature('PATENT-EXAMPLE',funcId3),
pos(funcId3,0), [instance(var('FILE-DATA'),'PATENT-EXAMPLE_instance_9')]).
atomArc('PATENT-EXAMPLE_node_12', 'module(PATENT-EXAMPLE)-funcId2-call1,module(PATENT-
EXAMPLE)-funcId1', 'module(PATENT-EXAMPLE)-funcId2-call1,module(PATENT-EXAMPLE)-funcId1'-
signature('PATENT-EXAMPLE',funcId2), instance(var('ADJUSTMENT'),'PATENT-EXAMPLE_instance_3'),
[pos(funcId2,0)]).
atomArc('PATENT-EXAMPLE_node_12', 'module(PATENT-EXAMPLE)-funcId2-call1,module(PATENT-
EXAMPLE)-funcId1', 'module(PATENT-EXAMPLE)-funcId2-call1,module(PATENT-EXAMPLE)-funcId1'-
signature('PATENT-EXAMPLE',funcId2), instance(var('FILE-DATA'),'PATENT-EXAMPLE_instance_6'),
[pos(funcId2,1)]).
atomArc(signature('PATENT-EXAMPLE',funcId2), 'module(PATENT-EXAMPLE)-funcId2-
call1,module(PATENT-EXAMPLE)-funcId1', 'module(PATENT-EXAMPLE)-funcId1'-'PATENT-
EXAMPLE_node_8', pos(funcId2,0), [instance(var('ADJUSTMENT'),'PATENT-EXAMPLE_instance_2')]).
atomArc(signature('PATENT-EXAMPLE',funcId2), 'module(PATENT-EXAMPLE)-funcId2-
call1,module(PATENT-EXAMPLE)-funcId1', 'module(PATENT-EXAMPLE)-funcId1'-'PATENT-
EXAMPLE_node_8', pos(funcId2,1), [instance(var('FILE-DATA'),'PATENT-EXAMPLE_instance_2')]).
atomArc(signature('PATENT-EXAMPLE',funcId2), 'module(PATENT-EXAMPLE)-funcId2-
call1,module(PATENT-EXAMPLE)-funcId1', 'module(PATENT-EXAMPLE)-funcId2-call1,module(PATENT-
EXAMPLE)-funcId1'-'PATENT-EXAMPLE_node_12', instance(var('FILE-DATA'),'PATENT-
EXAMPLE_instance_7'), [instance(var('ADJUSTMENT'),'PATENT-
EXAMPLE_instance_3'),instance(var('FILE-DATA'),'PATENT-EXAMPLE_instance_6')]).
atomArc('PATENT-EXAMPLE_node_13', 'module(PATENT-EXAMPLE)-funcId3-call2,module(PATENT-
EXAMPLE)-funcId1', 'module(PATENT-EXAMPLE)-funcId3-call2,module(PATENT-EXAMPLE)-funcId1'-
signature('PATENT-EXAMPLE',funcId3), instance(var('ADJUSTMENT'),'PATENT-EXAMPLE_instance_4'),
[pos(funcId3,0)]).
atomArc('PATENT-EXAMPLE_node_13', 'module(PATENT-EXAMPLE)-funcId3-call2,module(PATENT-
EXAMPLE)-funcId1', 'module(PATENT-EXAMPLE)-funcId3-call2,module(PATENT-EXAMPLE)-funcId1'-
signature('PATENT-EXAMPLE',funcId3), instance(var('FILE-DATA'),'PATENT-EXAMPLE_instance_8'),
[pos(funcId3,1)]).
atomArc(signature('PATENT-EXAMPLE',funcId3), 'module(PATENT-EXAMPLE)-funcId3-
call2,module(PATENT-EXAMPLE)-funcId1', 'module(PATENT-EXAMPLE)-funcId1'-'PATENT-
EXAMPLE_node_8', pos(funcId3,0), [instance(var('ADJUSTMENT'),'PATENT-EXAMPLE_instance_2')]).
atomArc(signature('PATENT-EXAMPLE',funcId3), 'module(PATENT-EXAMPLE)-funcId3-
call2,module(PATENT-EXAMPLE)-funcId1', 'module(PATENT-EXAMPLE)-funcId1'-'PATENT-
EXAMPLE_node_8', pos(funcId3,1), [instance(var('FILE-DATA'),'PATENT-EXAMPLE_instance_2')]).
atomArc(signature('PATENT-EXAMPLE',funcId3), 'module(PATENT-EXAMPLE)-funcId3-
call2,module(PATENT-EXAMPLE)-funcId1', 'module(PATENT-EXAMPLE)-funcId3-call2,module(PATENT-
EXAMPLE)-funcId1'-'PATENT-EXAMPLE_node_13', instance(var('FILE-DATA'),'PATENT-
EXAMPLE_instance_9'), [instance(var('ADJUSTMENT'),'PATENT-
EXAMPLE_instance_4'),instance(var('FILE-DATA'),'PATENT-EXAMPLE_instance_8')]).
```

*FIG. 16B*

```
dfm('PATENT-EXAMPLE', dataFlowMachine).
dfm('PATENT-EXAMPLE', argSignature([])).
dfm('PATENT-EXAMPLE', moduleName('PATENT-EXAMPLE')).
dfm('PATENT-EXAMPLE', moduleType(dfm)).
dfm('PATENT-EXAMPLE', resultSignature([])).
dfm('PATENT-EXAMPLE', dfmEdge('PATENT-EXAMPLE_node_1','PATENT-
EXAMPLE_node_3')).
dfm('PATENT-EXAMPLE', dfmEdge('PATENT-EXAMPLE_node_10','PATENT-
EXAMPLE_node_11')).
dfm('PATENT-EXAMPLE', dfmEdge('PATENT-EXAMPLE_node_2','PATENT-
EXAMPLE_node_3')).
dfm('PATENT-EXAMPLE', dfmEdge('PATENT-EXAMPLE_node_3','PATENT-
EXAMPLE_node_8')).
dfm('PATENT-EXAMPLE', dfmEdge('PATENT-EXAMPLE_node_4','PATENT-
EXAMPLE_node_6')).
dfm('PATENT-EXAMPLE', dfmEdge('PATENT-EXAMPLE_node_5','PATENT-
EXAMPLE_node_6')).
dfm('PATENT-EXAMPLE', dfmEdge('PATENT-EXAMPLE_node_6','PATENT-
EXAMPLE_node_8')).
dfm('PATENT-EXAMPLE', dfmEdge('PATENT-EXAMPLE_node_7','PATENT-
EXAMPLE_node_8')).
dfm('PATENT-EXAMPLE', dfmEdge('PATENT-EXAMPLE_node_8','PATENT-
EXAMPLE_node_11')).
dfm('PATENT-EXAMPLE', dfmEdge('PATENT-EXAMPLE_node_9','PATENT-
EXAMPLE_node_11')).
dfm('PATENT-EXAMPLE', dfmStmt('PATENT-
EXAMPLE_node_1',stmt(assign(instance(var('FILENAME'),'PATENT-
EXAMPLE_instance_2')=file1)))).
dfm('PATENT-EXAMPLE', dfmStmt('PATENT-
EXAMPLE_node_10',stmt(assign(instance(var('FILE-KEY'),'PATENT-
EXAMPLE_instance_6')=write)))).
dfm('PATENT-EXAMPLE', dfmStmt('PATENT-
EXAMPLE_node_11',stmt(io(write(instance(var('FILENAME'),'PATENT-
EXAMPLE_instance_4'),instance(var('FILE-DATA'),'PATENT-
EXAMPLE_instance_5'),instance(var('FILE-KEY'),'PATENT-
EXAMPLE_instance_6'),instance(var('STATUS-VAR'),'PATENT-EXAMPLE_instance_3')))))).
dfm('PATENT-EXAMPLE', dfmStmt('PATENT-
EXAMPLE_node_12',stmt(assign(instance(var('FILE-DATA'),'PATENT-
EXAMPLE_instance_7')=instance(var('FILE-DATA'),'PATENT-
EXAMPLE_instance_6')+instance(var('ADJUSTMENT'),'PATENT-EXAMPLE_instance_3'))))).
dfm('PATENT-EXAMPLE', dfmStmt('PATENT-
EXAMPLE_node_13',stmt(assign(instance(var('FILE-DATA'),'PATENT-
EXAMPLE_instance_9')=instance(var('FILE-DATA'),'PATENT-EXAMPLE_instance_8')-
instance(var('ADJUSTMENT'),'PATENT-EXAMPLE_instance_4'))))).
```

*FIG. 16C*

```
forwardAtomArc('PATENT-EXAMPLE_node_8', 'module(PATENT-EXAMPLE)-funcId1',
'module(PATENT-EXAMPLE)-funcId3-call2,module(PATENT-EXAMPLE)-funcId1'-
signature('PATENT-EXAMPLE',funcId3), pos(funcId3,0),
[instance(var('ADJUSTMENT'),'PATENT-EXAMPLE_instance_4')]).
forwardAtomArc('PATENT-EXAMPLE_node_8', 'module(PATENT-EXAMPLE)-funcId1',
'module(PATENT-EXAMPLE)-funcId3-call2,module(PATENT-EXAMPLE)-funcId1'-
signature('PATENT-EXAMPLE',funcId3), pos(funcId3,1), [instance(var('FILE-DATA'),'PATENT-
EXAMPLE_instance_8')]).
forwardAtomArc('PATENT-EXAMPLE_node_13', 'module(PATENT-EXAMPLE)-funcId3-
call2,module(PATENT-EXAMPLE)-funcId1', 'module(PATENT-EXAMPLE)-funcId3-
call2,module(PATENT-EXAMPLE)-funcId1'-signature('PATENT-EXAMPLE',funcId3),
instance(var('FILE-DATA'),'PATENT-EXAMPLE_instance_9'), [pos(funcId3,0)]).
```

MACHINE-BASED NORMALIZATION OF MACHINE INSTRUCTIONS

CROSS-REFERENCE TO RELATED APPLICATIONS

The present application is national stage application under 35 U.S.C. 371 of PCT Application No. PCT/US2016/031882, having an international filing date of May 11, 2016, which designated the United States, which PCT application claims the benefit of U.S. Provisional Patent Application No. 62/160,076, filed May 12, 2015, entitled "Functions and Visualization 1" and U.S. Provisional Patent Application No. 62/161,519, filed May 14, 2015, entitled "Normalization", each of which is incorporated herein by reference in their entirety.

FIELD OF THE DISCLOSURE

The present disclosure is generally directed toward hardware and software and more particularly to machine-based pattern recognition and selective editing and even more specifically to transforming and regenerating computer code.

BACKGROUND

Programmable machines continue to progress as software and software writing tools advance. However, programmers may still rewrite software that has already been written due to the time requirements associated with finding and reviewing existing software, personal preference, lack of knowledge of the presence of existing software, or other reasons. As a result, software often includes code portions that may be less than ideal, even if functionally equivalent. Previous solutions that address this problem include "Software Equivalence Checking," U.S. Patent Publication No. 2011/0138362, which is incorporated herein by reference in its entirety.

Compilers and interpreters convert human-readable source code into machine-readable code (e.g., object code, executable code, etc.) for execution. Compilers can negate the effects of many coding issues, but not all and not always completely. For example, a piece of software code comprising the traversal of each element of an array may have different performance characteristics if the coder traverses the array by row elements and then increments the column, or by column elements and then increments the row. Object code, such as an assembler, may store values differently and require more processing steps when using one technique versus another, even though the end result is the same. Similarly, the choice of a particular sorting methodology may have a significant impact on performance based on the data being sorted. For example, a bubble sort is efficient when sorting a relatively small number of elements or a large number of elements that have only a few elements that are not in sort-order. However, bubble sort is likely to be a poor choice for most other applications.

Even if two sets of software each produce the same result, not all software has the same effect, such as within an application or within a software management system. Software may have inefficiencies or other undesirable issues. As a result, computers or other machines executing software may operate in a less than ideal capacity.

SUMMARY

Certain embodiments disclosed may utilize SMT solvers and may be more readily understood with the benefit of "Decision Procedures, An Algorithmic Point of View," Kroening and Strichman, 2008, ISBN: 978-3-540-74104-6, which is incorporated herein by reference in its entirety and for all that it teaches.

Software or "code" refers to instructions written by a human for use by a machine, such as a microprocessor (or, more commonly, "processor"), once the code is put into a machine-readable form by a compiler, interpreter, linker, etc. Software has many attributes beyond the functionality for which it was written or the result it produces. For example, software requires space, requires machine cycles, is read by humans who may or may not have written the original source software, may have security vulnerabilities, may require updating, may require porting to a different platform, and/or other aspects.

A "function" as used herein, includes software functions, subroutines, procedures, (machine-executable) methods, predicates, sequences of instructions or rules within a larger computer program, or a relation that associates an input to an output according to a rule. The single output may comprise a primitive data type or a more complex data type such as a composite or abstract data type.

Software may originally be written for a specific platform utilizing a specific programming language. Requirements of the language and/or platform may instill certain limitations that would not apply if ported to a different language and/or platform. For example, one programming language may not have pass-by-reference, wherein a variable's value is accessed by a memory address, even if unseen by the programmer. If the content of the memory address changes, the value of the variable changes. Porting a program written in such a language into a language that does incorporate pass-by-reference would present opportunities to improve readability, performance, storage, and/or other benefits that were not previously available.

Software written in a particular programming language may be converted to a language-agnostic form. As a result, software that performs the same function, but written in two different languages and/or for two different platforms, would appear the same once each is converted to its language-agnostic form. Limitations inserted into the software, such as by a characteristic of the particular programming language, may be removed and thereby improvements in performance, space requirements, functionality, security, usability, and/or other aspects may be realized.

Once a language-agnostic form has been determined, the process may be reversed and a transformation performed to produce a language-specific source code. As a benefit, any programming language or version may be automatically converted to any other language or version.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

The term "data repository," as used herein, is any one or more of a device, media, component, portion of a component, collection of components, and/or other structure capable of storing data accessible to a processor. Examples of data repositories contemplated herein include, but are not limited to, processor registers, on-chip storage, on-board storage, hard drives, solid-state devices, fixed media devices, removable media devices, logically attached storage, networked storage, distributed local and/or remote storage (e.g., server farms, "cloud" storage, etc.), media (e.g., solid-state, optical, magnetic, etc.), and/or combinations thereof. The data repository is accessible to at least one processor but may be logically and/or physically detached from the processor during times when no processor has a present need for access. The data repository may be directly accessible or via one or more intervening components, including but not limited to, a cache and/or buffer. In certain embodiments, the data repository may be organized into a database, file, record, or other logical storage structure and/or portion or collection thereof.

BRIEF DESCRIPTION OF THE DRAWINGS

The present disclosure is described in conjunction with the appended figures:

FIGS. 1A-1B depicts a while loop in a conventional form and while loop in an SSA form in accordance with embodiments of the present disclosure;

FIGS. 4A-4C depict a source code, a COB representation of the source code, and a DOB representation of the source code;

FIGS. 7A-7B depict a mapping in accordance with embodiments of the present disclosure;

FIGS. 12A-12B depicts a regeneration in accordance with embodiments of the present disclosure;

FIG. 14 depicts an example original source code in accordance with embodiments of the present disclosure;

FIGS. 15A-15E depict an example CFG representation in accordance with embodiments of the present disclosure; and FIG. 16A-16J depict an example DFG in accordance with embodiments of the present disclosure.

DETAILED DESCRIPTION

Figures 2A, 2B:
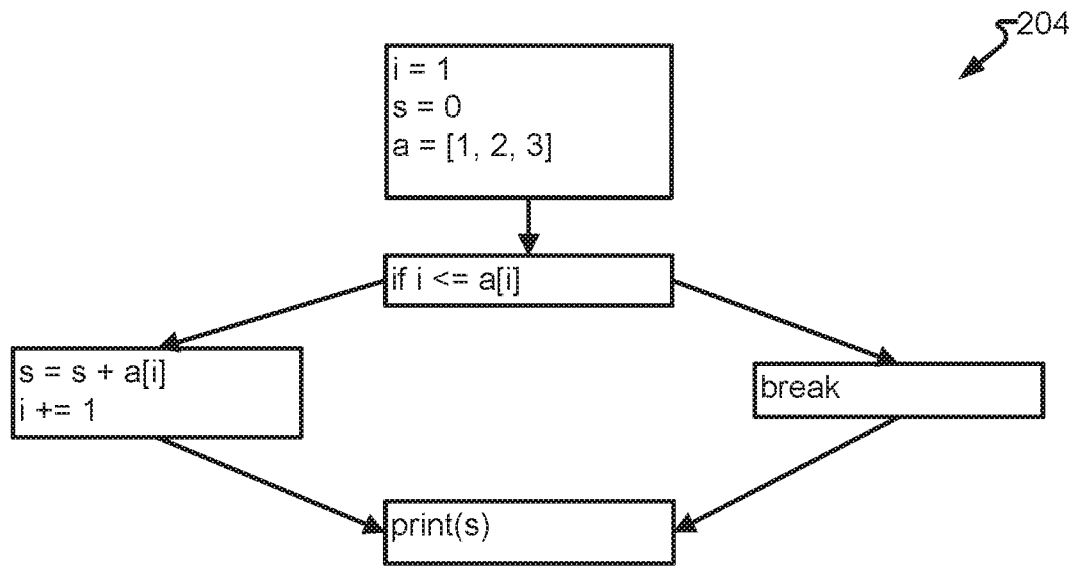
FIGS. 2A-2B depicts a source code in a conventional form and a converted source code in a CFG representation.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

In one embodiment, dependency ordered behavior ("DOB") representations provide embodiments wherein canonical representations of language-agnostic code structures may be generated and, in further embodiments, utilized for the regeneration of alternate programming languages.

Introduction to Dependency Ordered Behavior:

In one embodiment, canonical representations of source code structures are provided that are agnostic of any programming language. These representations preserve the data flow encoded within the program, and provide assurances that they are correct and complete. To provide these features, the DOB representationd are provided.

DOB representations may comprise graphs in the formal mathematical sense. Such representations may be generated from software source code, which may then be used in downstream applications such as application functions.

DOB representations may comprise a graph in the formal sense of graph theory. In one embodiment, a DOB is a directed graph with nodes (also called vertices or points) and arcs (also called lines). Nodes in DOB may be a quadruple <I;S;D;C>, where I is a unique identifier, S is an executable statement, D is the input value(s) (if any), and C is the output value(s), if any. In this way, every node also represents a functional statement within a program's source code, which can be independently executed assuming all the inputs exist.

Nodes are connected by arcs, which represent directional data flow in a DOB. In one embodiment, an arc may be generated from node B to node A if node A generates a data value that node B takes as input.

In one embodiment, the term "dependency flow machine" (DFM) is used to refer to the programmatic implementation of a DOB representation. A DFM is thus an implementation of a DOB, which is a more general term referring to the information representation. Similarly, a "control flow machine" (CFM) refers to an implementation of a COB.

Methodology:

In one embodiment, a single static assignment (SSA) methodology of data representation is provided. SSA is often used in static analysis and compiler theory, and is helpful to realizing certain implementations of canonical code representation. In one SSA form, every variable is assigned exactly once. If the value of a variable changes, an entirely new variable is assigned the new value, instead of reassigning the old variable's value. For instance, if x is a variable that changes value, a conventional assignment would be:

$x=1$ $x=x+1$

In SSA form, the values would instead be assigned as:

$x(1)=1$ $x(2)=x(1)+1$

SSA is useful for program analysis, which includes optimization of code and compilers. Moreover, the fact that every variable is assigned only once makes SSA form useful for analysis of control and data flow.

Converting conventional code into SSA form is a well-studied topic. For simple code, such as in the example above, every variable may be automatically assigned to another instance of itself, every time that its value is reassigned in some way. However, as can be immediately intuited, one drawback is that SSA-formatted code can be much larger than conventional code. Complexities also arise when dealing with unpredictable variable assignment, such as branches (i.e., if-else) and loops (i.e., for, do-while).

Broadly speaking, to handle unpredictable variable assignments, SSA employs a φ (phi) function. A φ function takes, as input, all the possible values that might be assigned to a variable. The role of the φ function is to "choose" what value is assigned, and then to output that variable with a new assignment, thereby preserving SSA, an example is illustrated with respect to FIGS. 1A-1B.

FIG. 1A-1B depicts while loop 102 in a conventional form and while loop 104 in an SSA form in accordance with embodiments of the present disclosure.

Control Ordered Behavior Representation Generation:

Because DOB representations are generated from control ordered behavior (COB) representations, it may be necessary to first discuss COB representations. A control flow machine (CFM) may generate the DFM.

In one embodiment, a COB representation is equivalent in principle to a control flow graph (CFG), a concept of the prior art computer science, particularly in the field of compilers. Briefly, a CFG is a graphical representation of a computer program's internal software structure. The CFG depicts all the paths and nodes that the program is able to traverse during execution. Similar to a DOB, in a CFG, every node represents a block of instructions that can be carried out, and an arc (or "node path") represents a block of instructions that can be carried out, and an arc represents the flow of control form one instruction to another. CFGs are useful for analyzing and optimizing code at the compiler level, for example, by eliminating unreachable code and unrolling loops. Thus, they are often generated by compilers as an intermediate data structure between higher-level human-written source code and lower-level machine code. An example representing code as a CFG is provided with respect to FIG. 2A-2B.

FIG. 2A-2B depicts source code 202 in a conventional form and converted source code 204 in a CFG representation.

Table 1 provides one example of an algorithm comprising a generalized example of steps executed by a processor, such as executing a compiler, to generate a CFG, such as converted source code 204.

TABLE 1

1: procedure: GENERATE NODES
2: Find leaders, the set of the first statements of nodes:
3:      The first statement in the program is a leader.
4:      A statement that is the target of a goto statement is a leader.
5:      A statement that immediately follows a goto statement is a leader.
6: Construct the nodes. For each leader, its node consists of the leader and all statements up to, but not including, the next leader or the program's end.
7: procedure: GENERATE PATHS
8:      for nodes B(i), (i+1)...(j) that contain exits do:
9:           If and only if Bi+1 immediately follows Bi in some execution sequence:
10:               Construct a path from B(i) to B(i+1).

Figure 3A:
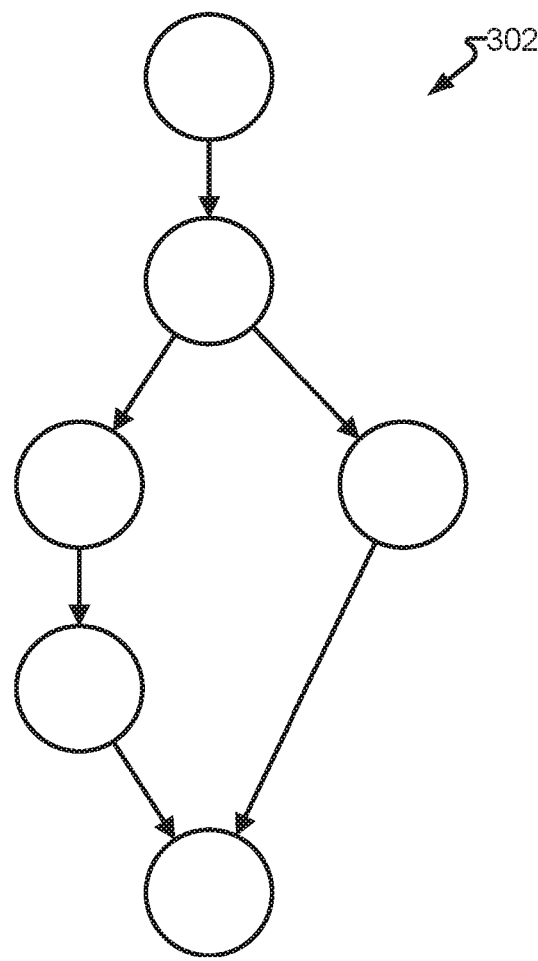
FIGS. 3A-3B depicts a CFG representation and a COB representation in accordance with embodiments of the present disclosure.
Figure 3B:
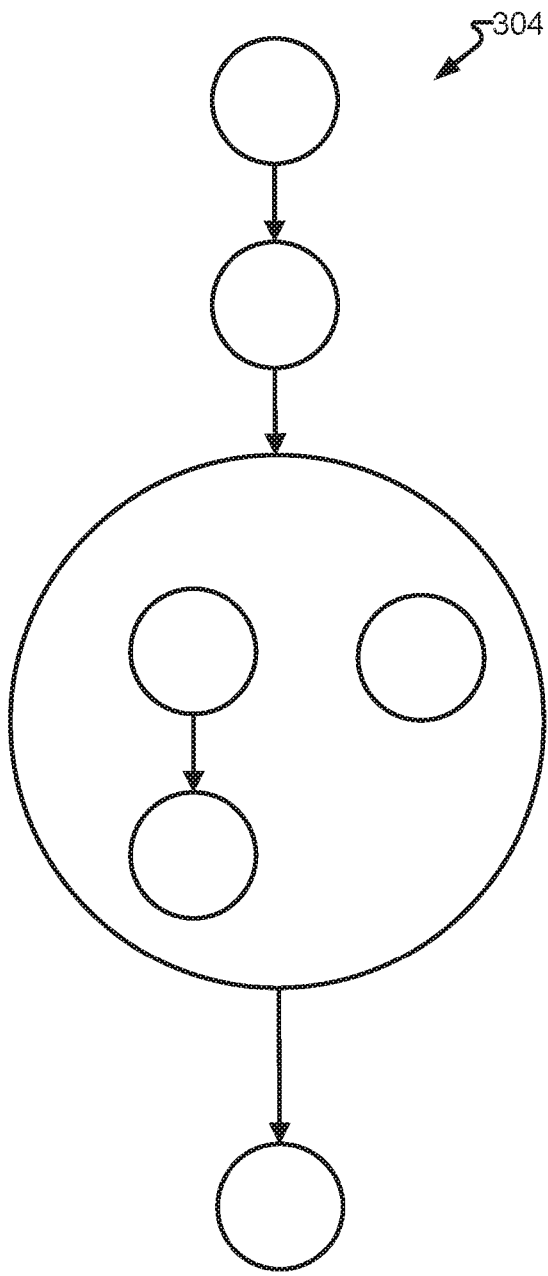

FIG. 3A-3B depicts CFG representation 302 and COB representation 304 in accordance with embodiments of the present disclosure.

In one embodiment, a specific complier and/or a generic compiler with specific settings, is utilized for the generation of COB representations, such as COB representation 304, as every programming language necessarily has its own "front end", every source code written in a language then has a specific COB-generating compiler written for that language.

Dependency Ordered Behavior Representation Generation:

In one embodiment, a DOB is generated from a COB by rearranging the graph's edges from control flow dependencies to data state dependencies. A DOB maintains peripherals in a manner similar that provided by the algorithm of Table 1.

FIGS. 4A-4C depict source code 404, COB representation 406 of source code 404, and DOB representation 408 of source code 404.

In one embodiment, and despite the different approaches to statement execution provided by COB and DOB, when a COB is converted into a DOB, both are guaranteed to evaluate to semantically identical results, from the perspective of functional transformation of data or information. However, they are not guaranteed to yield the same state of the peripheral(s). This is because when the DOB is executed, it might not execute certain read, write, update, and/or delete statements that the COB will execute if there is not explicit data flow between the statements, which is required for a DOB to capture the interaction. For example, in FIG. 4A if a variable (e.g., "A") written to a peripheral, such as a spreadsheet, and the spreadsheet is updated, the variable might change. This event would be captured in a COB but not a DOB. A peripheral event graph (PEG), which stores information about program interactions with peripherals, may be generated and combined with a DOB to provide assurances that a DOB's behavior will be identical to that of its corresponding COB.

Figure 5:
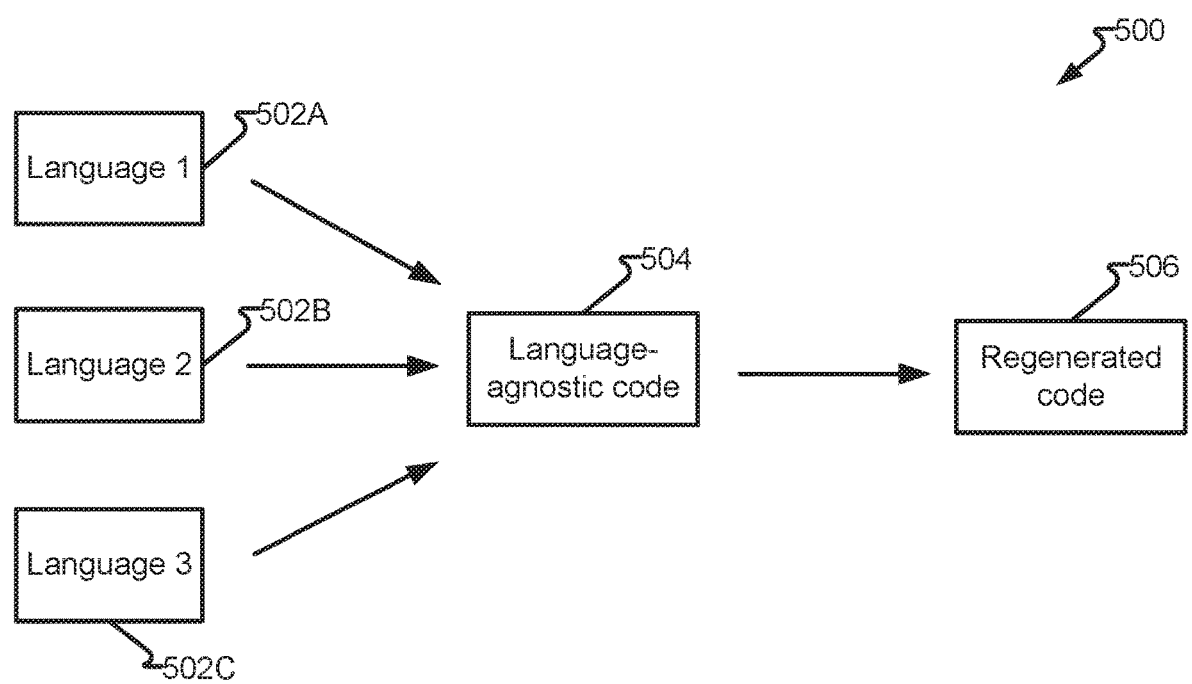
FIG. 5 depicts an interaction in accordance with embodiments of the present disclosure.

FIG. 5 depicts interaction 500 in accordance with embodiments of the present disclosure. In one embodiment, a number of source code 502 is provided, comprising source code 5 (502A) in a first language/platform, source code 2 (502B) in a second language/platform, and source code 3 (502C) in a third language/platform. In one embodiment, the difference between any of source code 502A, 502B, and 502C may be any one or more of the programming language (e.g., PASCAL, FORTRAN, C, C++, Java, Perl, etc.), standard of the programming language (e.g., ISO C, Standard C, ANSI C, etc.), version of the programming language (e.g., v 1.0, v 2.0, etc.), platform and/or operating system (e.g., LINUX, Windows-Intel, Apple iOS, OS/390, OS/2, etc.), etc. In another embodiment, the difference between any of source code 502A, 502B, and 502C may be any one or more of programming practices or other non-functional requirements, such as inclusion/omission of security features (e.g., encryption, authentication, etc.), documentation, localization, etc.

Source code 502 is accessed by a processor (not shown) operable to read source code from a data storage device and convert the read source code into language-agnostic code 504. The processor may then generate language-agnostic code 504 to become regenerated code 506. In one embodiment, regenerated code 506 may be in a format to accommodate a programming language, platform, documentation, security, localization, and/or other programming requirement. For example, source code 502A may be a COBOL program and, as a result of conversion to language-agnostic code 504, produce regenerated code 506, which may be a Java program comprising documentation and security features. As can be appreciated, the difference between a particular one of source code 502 and the resulting regenerated code 506 may comprise a variety of attributes alone or in combination. In another embodiment, regenerated code 506 may comprise a subset of source code 502.

As a further option, regenerated code 506 may be compiled, interpreted, linked, or otherwise made into machine-executable code by the processor.

Figure 6:
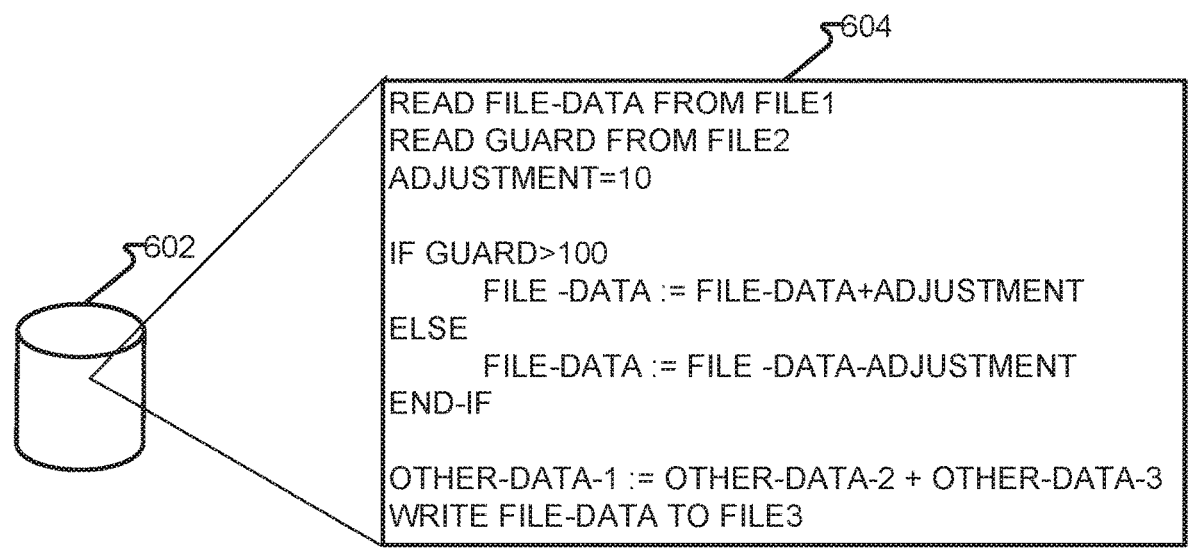
FIG. 6 depicts a storage device in accordance with embodiments of the present disclosure.

FIG. 6 depicts storage device 602 in accordance with embodiments of the present disclosure. Storage device 602 comprises an electronic record of source code 604. Storage device 602 may comprise any one or more of processor memory, on-board memory, accessible storage, network storage (e.g., NAS, "cloud," etc.), off-line storage, and/or other electronic, optical, and/or magnetic storage medium accessible to a processor.

In another embodiment, storage device 602 maintains a data structure comprising source code 604. Source code 604 may comprise one or more functions. Functions may be language-provided operations (e.g., variable assignment, mathematical operations, file operations, etc.), programmer-provided functions, linked functions, etc. In one embodiment, functions comprise at least one input variable, at least one output variable, and transformation whereby the at least one input variable is transformed into the at least one output variable. In another embodiment, the input variable and/or output variable is null or omitted. In yet another embodiment, the transformation is null, such as a placeholder for future non-null transformations, debugging purposes, etc.

Figure 7B:
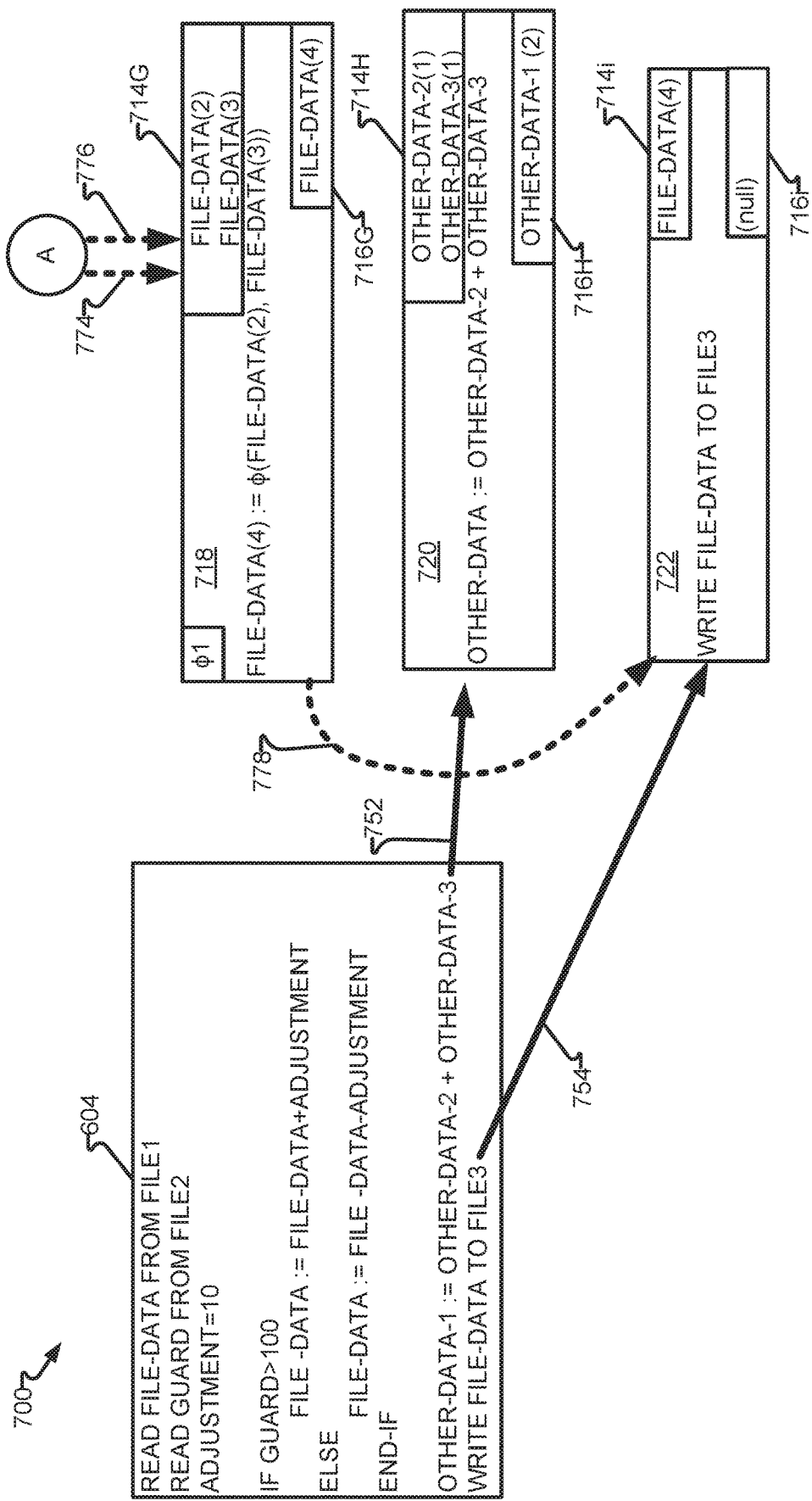

FIGS. 7A-7B depict mapping 700 in accordance with embodiments of the present disclosure. In one embodiment, functions of source code 604 are mapped to nodes. In a further embodiment, one or more of an input to the function being mapped to an input variable of a node, an output of the function, being mapped to an output of the node, and an operation of the function being mapped to a transformation of the node. The mapping of a function to a node may result in a one-to-one, many-to-one, one-to-many, or many-to-many (same or different number). For example, a simple addition function may map to a single addition transformation (one-to-one), a multi-step loop function may map to a single incrementing transformation (many-to-one), a single read function may map to a multi-step access, open, and read transformation (one-to-many), etc.

Mapping 700 illustrates the mapping of functions within source code 604 to nodes 702, 704, 706, 708, 710, 712, 720, and 722. Node 718 illustrates a special case, which is not directly mapped from source code 604 and discussed more completely below. Mapping of functions within source code 604 further comprises mapping inputs of the functions to input variables 714A-714i and outputs of the functions to output variables 716A-716i (The use of lower case "i" is used herein as an element reference to improve readability and for the avoidance of confusion with the number one that may result with the use of upper case "I."). More specifically, mapping 740 maps a function of source code 604 to node 702, input variable 714A, and output variable 716A; mapping 742 maps a function of source code 604 to node 704, input variable 714B, and output variable 716B; mapping 744 maps a function of source code 604 to node 706, input variable 714C, and output variable 716C; mapping 746 maps a function of source code 604 to node 708, input variable 714D, and output variable 716D; mapping 748 maps a function of source code 604 to node 712, input variables 714F, and output variable 716F; mapping 750 maps a function of source code 604 to node 710, input variables 714E, and output variables 716E; mapping 752 maps a function of source code 604 to node 720; input variables 714H and output variables 716H; and mapping 754 maps a function of source code 604 to node 722, input variable 714i, and output variable 716i.

The establishment of input variables 714A-714i and output variables 716A-716i allows for commonality between the inputs of nodes to be associated with outputs of other nodes and a node path resulting therefrom. In one embodiment, output variable 716A is common with input variable 714E and input variable 714F as indicated by node path component 760 and 762, respectively. Similarly, node path component 764 associates output variable 716B with input variable 714D; node path component 766 associates output variable 716C with input variable 714E; node path component 768 associates output variable 716C with input variable 714F; node path component 770 associates output variable 716D with input variable 714E; node path component 772 associates output variable 716D with input variable 714F; node path component 774 associates output variable 716E (via off-page connector "A") with input variable 714G; node path component 776 associates output variable 716F (via off-page connector "A") with input variable 714G; and node path component 778 associates output variable 716G with input variable 714i.

In one embodiment, reconciliation node 718 is provided. Reconciliation node 718 illustrates a common node associated with a plurality of nodes. For example, node 710 provides output variable 716E and node 712 provides output variable 716F. Although output variable 716E and output variable 716F represent two distinct instances (e.g., "FILE-DATA(2)" and "FILE-DATA(3)"), they are the same variable (e.g., "FILE-DATA") and are unified by reconciliation node 718, which may be known as a "phi" node or function. Reconciliation node 718 unifies the association with input variable 714i to appear as a single association therewith.

Node 720 illustrates an unreachable node. The portion of source code 604 associated with node 720 would normally be executed; however, output variable 716H is not used and, therefore, node 720 becomes unreachable due to lack of association with the input variable of any other node. It should be appreciated that two or more nodes may comprise an unreachable node set, such as when a number of nodes work in concert to produce an output variable that is discarded. In another embodiment, node 720 may be reachable code, such as when additional nodes are introduced to mapping 700. For example, mapping 700 may be integrated (e.g., copied, linked, etc.) to form a larger mapping. Additionally, an existing one of nodes 702, 704, 706, 708, 710, 712, and 722 may be modified and/or an additional node may be provided to cause node 720 to be reachable.

In another embodiment, nodes may be associated with themselves (e.g., recursion), such as when the output of a particular node is the input of another instance of the same node. For example, a node associated with a factorial operation (e.g., "factorial(x)") may call itself with the value of one less than the current value of the number (e.g., (x−1), until the value equals one (e.g., 1!=1). Each function instance then provides an output to the prior instance of itself, performs the multiplication of the value of the instance held for the variable and returns the value (e.g., "return x*factorial(x−1)") until the output node instance (e.g., the first called "factorial(x)") is reached.

In another embodiment, source code 604 comprising specific (e.g., language, version, platform, etc.) structures, functions, etc. are converted into language-agnostic code via a processor executing instructions to associate a pattern provided by at least a portion of source code 604 with an associated language-agnostic code. In another embodiment, the processor converts transformations provided by nodes to language-agnostic code via pattern matching and/or other association whereby a specific code may be converted to a language-agnostic code.

Figure 8A:
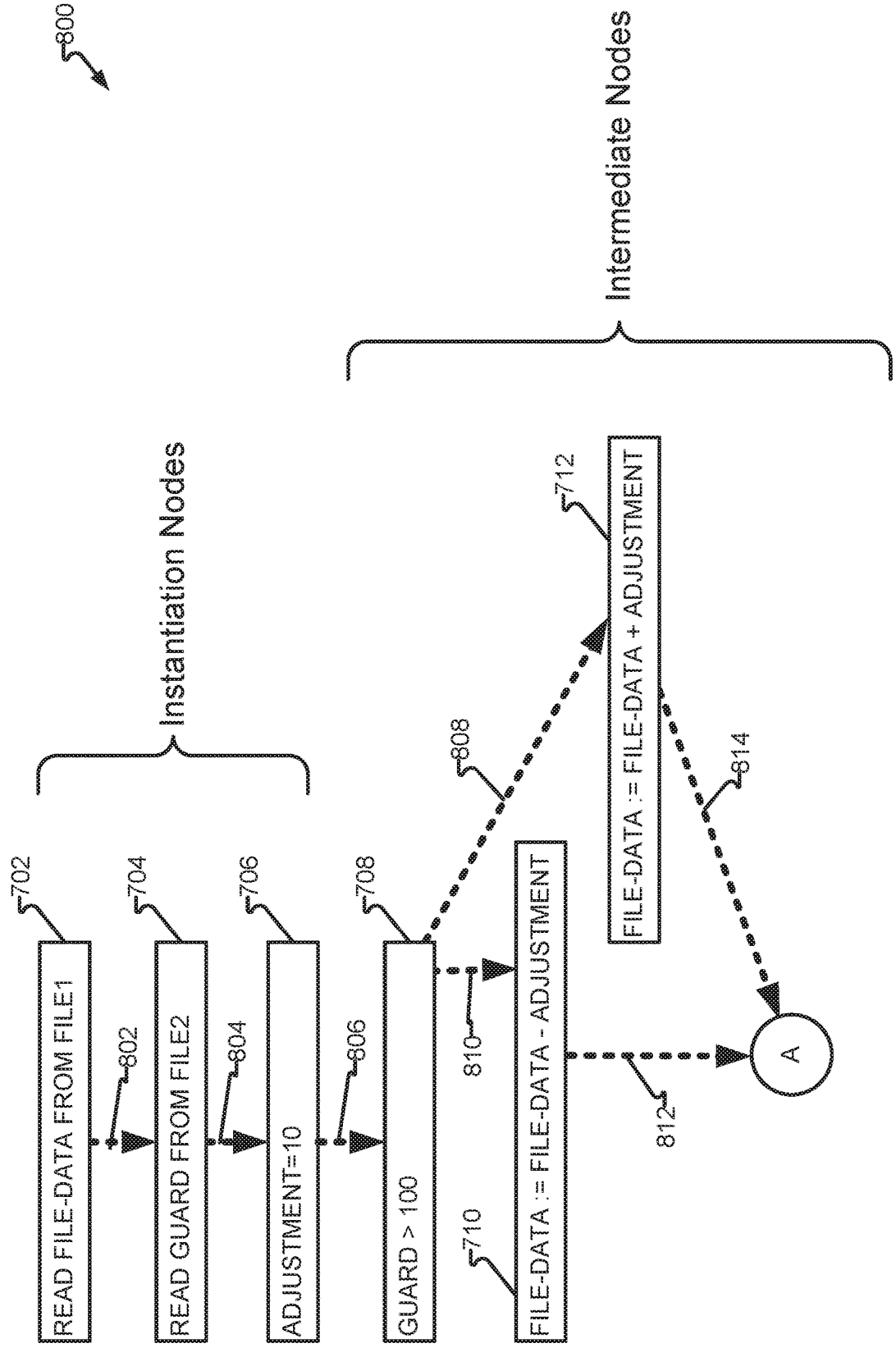
FIGS. 8A-8B depict a node path determination in accordance with embodiments of the present disclosure.
Figure 8B:
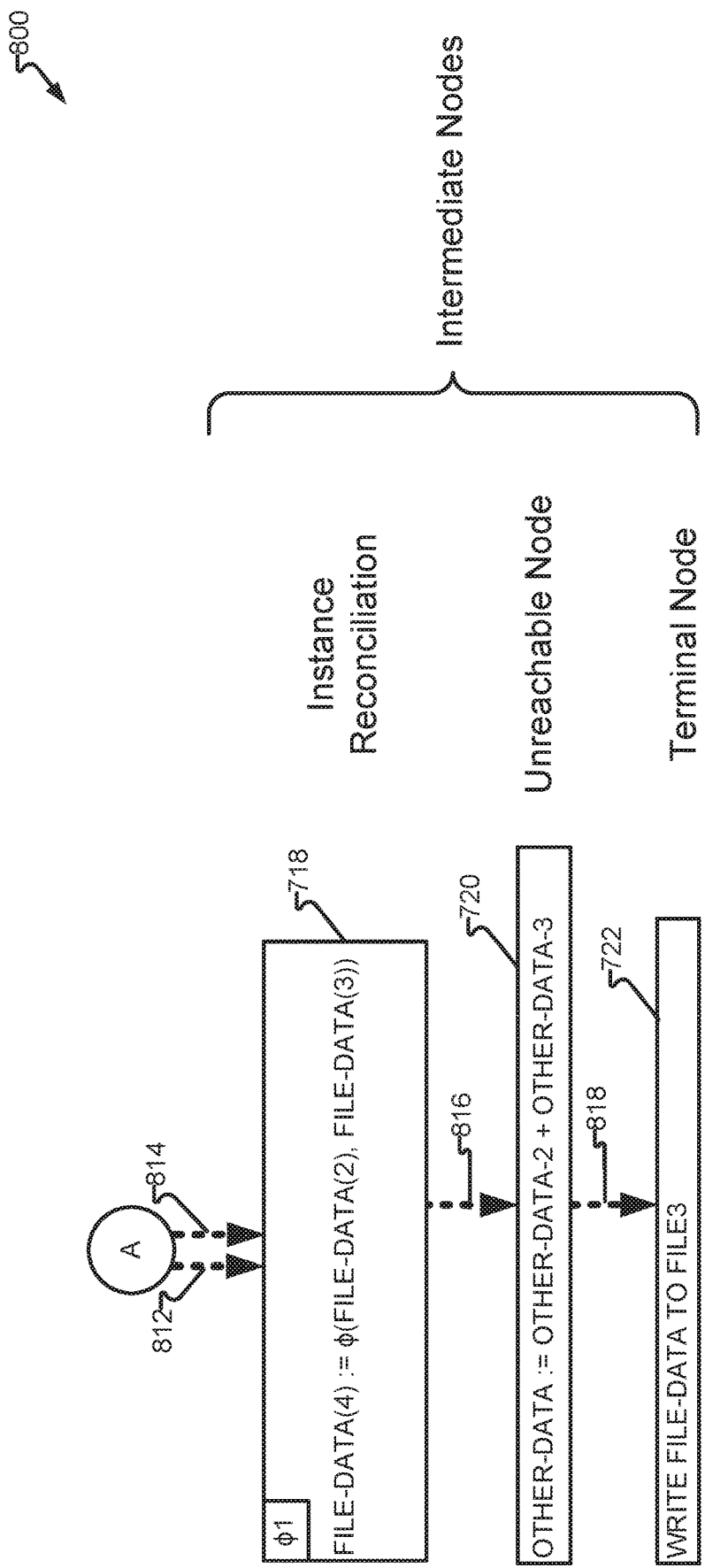

FIGS. 8A-8B depict node path determination 800 in accordance with embodiments of the present disclosure. In one embodiment, nodes 702, 704, and 706 are identified as "instantiation nodes" as their associated input variables (See, FIGS. 7A-7B) are null. Instantiation nodes instantiate a variable which may be set within the instantiation node, such as to a read value and thereby being a read node, a subset of the instantiation nodes, or left unset (e.g., null), such as to be determined by a subsequent node. In another embodiment, a read node sets the value of a variable previously instantiated and, therefore, in such embodiments may comprise a subset of intermediate nodes. In another embodiment, nodes 708, 710, 712, 720, 722, and node 718 (if implemented) may be identified as "intermediate nodes" as each has an input node associated with the output node of another node. Additionally, node 722 is identified as a terminal node as the output of node 722 comprises an output of source code 604 and, therefore, an output of all nodes. As provided above, node 718 is identified as a reconciliation node and node 720 is identified as an unreachable node.

In another embodiment, process flow comprises transition 802, between nodes 702 and 704; transition 804, between nodes 704 and 706; transition 806, between nodes 706 and 708; transition 810, between nodes 708 and 710; transition 808, between nodes 708 and 712; transition 812, between nodes 710 and (via off-page connector) node 718; transition 814, between node 712 and (via off-page connector) node 718; transition 816, between node 718 and node 720; and transition 818 between node 720 and node 722. In one embodiment, a node path is determined by nodes connected via transitions, such as transitions 802, 804, 806, 808, 810, 812, 814, 816, and 818. As more fully described with respect to FIGS. 9A-9B, performing a "bottom up" traversal of nodes allows for additional unreachable code to be identified. Node 720 is unreachable in a data flow model (see FIGS. 9A-9B) in that the output is unused. However, node 720 is reachable in a control flow model (as illustrated with respect to FIGS. 8A-8B) in node 720 provides executable statements that would follow the execution of the executable statements of node 718.

Figure 9A:
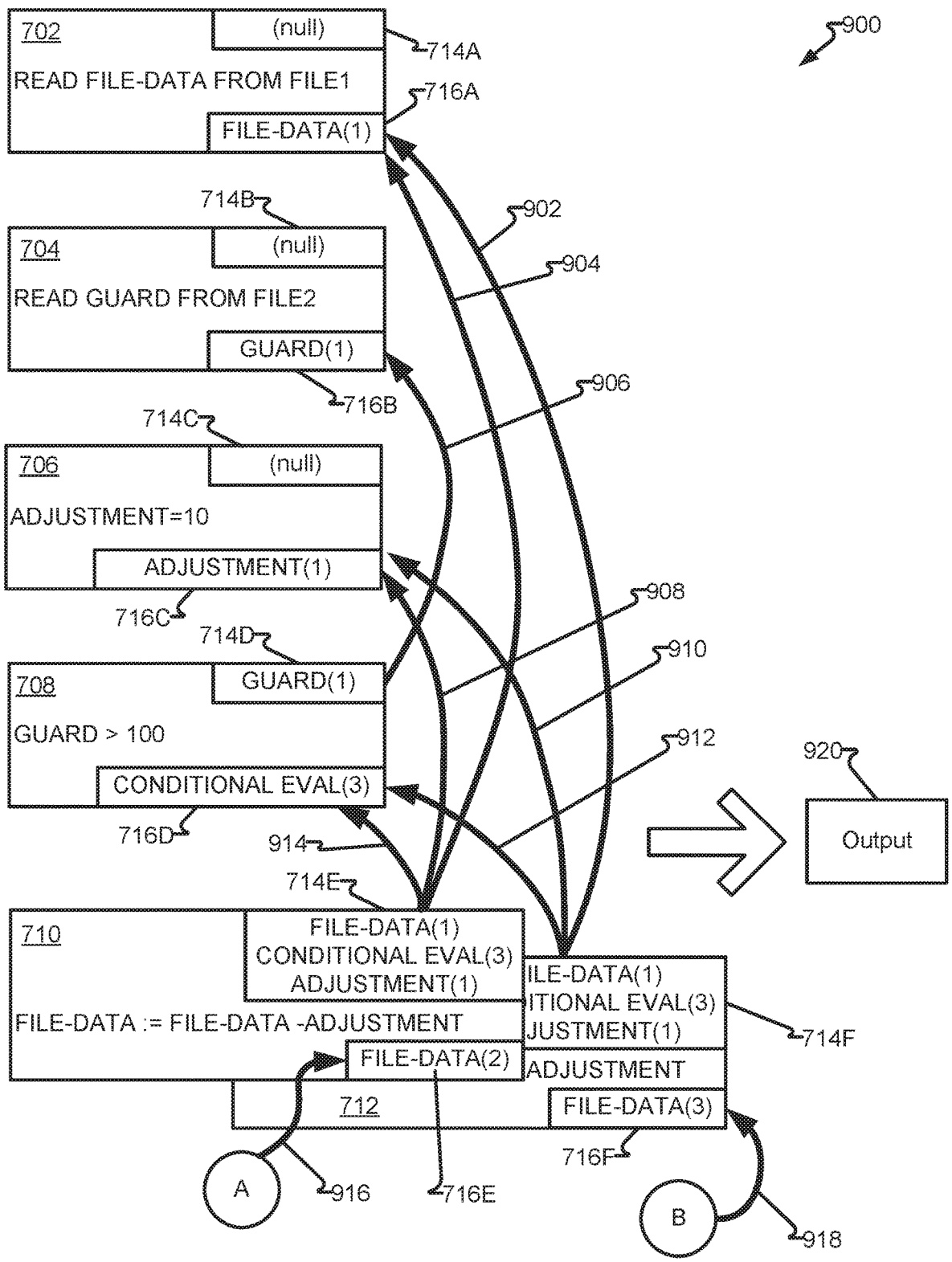
FIGS. 9A-9B depict an output data flow in accordance with embodiments of the present disclosure.
Figure 9B:
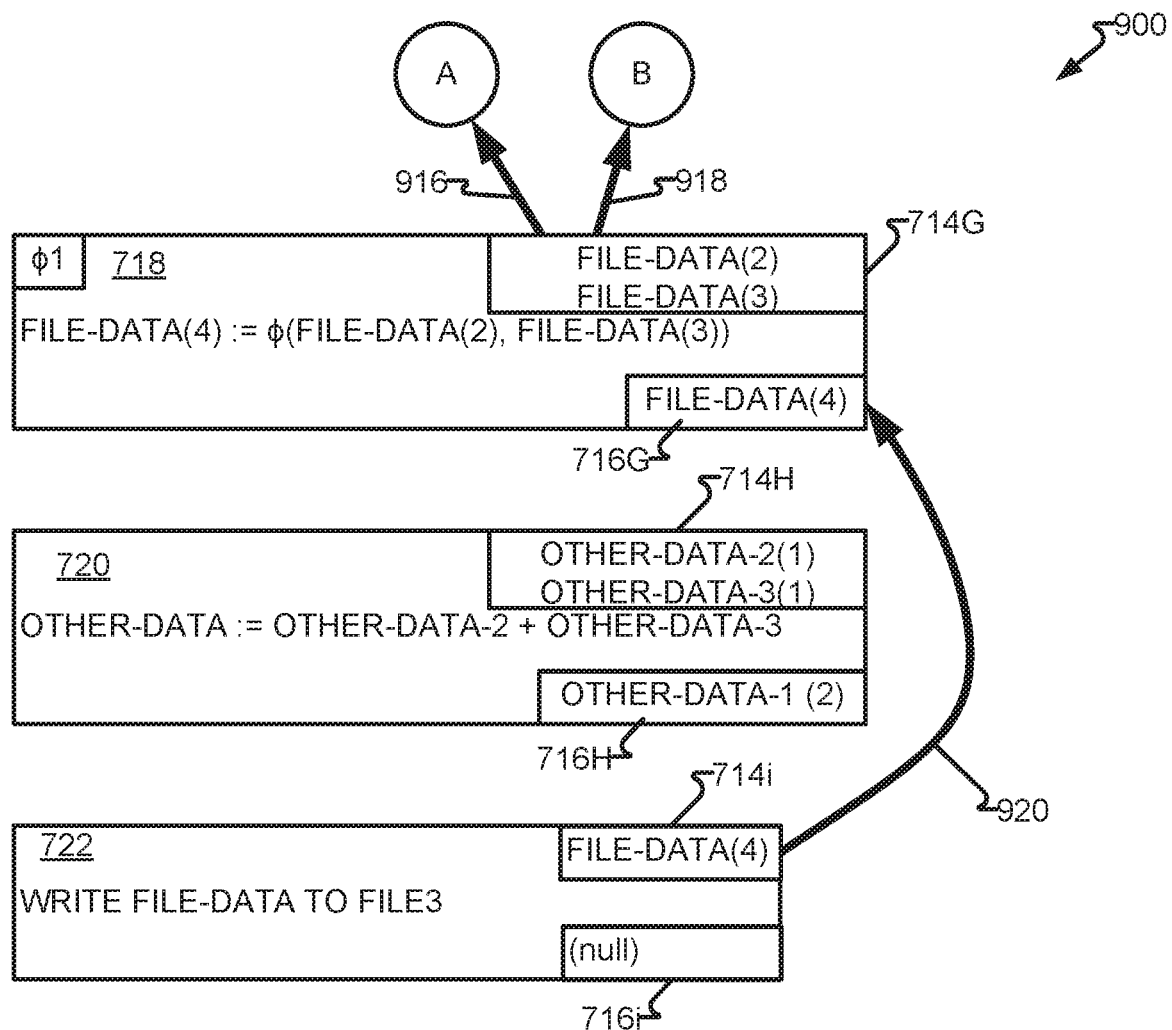

FIGS. 9A-9B depict output data flow 900 in accordance with embodiments of the present disclosure. In one embodiment, a node path is provided as output 920. In another embodiment, a node path originates from terminal node 722 and traverses the nodes from input variable to associated output variable. Node paths may originate from a terminal node, such as node 722, and end at one or more instantiation nodes, such as nodes 702, 704, and 706. As a benefit, one or more node paths may be determined wherein all nodes are then known to be called. As a benefit of this "bottom-up" traversal, the origination of the node path is the point at which a value has changed; a value that has been provided as output and thereby changed outside of a program.

For example, node path portion 902 associates node 722 with reconciliation node 718; node path portion 916 associates (via off-page connector "A") node 718 with node 710; node path portion 918 associates (via off-page connector "B") node 718 with node 712; node path portion 914 associates node 710 with node 708; node path portion 908 associates node 710 with node 706, node path portion 904 associates node 710 with node 702; node path portion 912 associates node 712 with node 708; node path portion 910 associates node 712 with node 706; node path portion 902 associates node 712 with node 702; and node path portion 906 associates node 708 with node 704.

In another embodiment, output 920 comprises canonical definitions associated with a particular function. The specific canonical definitions may be a matter of design choice. In one example, an assignment (e.g., "A=B+C") may be associated with a canonical definition (e.g., "ASSIGN A=(ADD (B,C))"). Similarly, programmer-provided functions may be "flattened" such that all operations are reduced to atomic and/or canonical operations. As a result and in one embodiment, output 920 comprises language-agnostic source code, which may then be regenerated into language-specific source code, which may not support function names and/or have different function names. For example, "funcA" may be called "funcB" and "funcC." Output 920 may then have the atomic operations of each of funcA, funcB, and funcC without calls thereto. Output 920 may be regenerated to provide alternative functions, for example, funcA and funcBC. As a further option, semantic meaning may be inserted such as to rename "funcA" to become "UpdateBalance" and "funcBC" to "ifSufficientMakeWithdrawal."

In another embodiment, a variable or function name may be associated with dissimilar names, for example, "x=getBalance(custNumber)." Regenerated source code may then replace the variable name "x," when encountered, with a more meaningful name, such as by determining a noun or verb within the function (e.g., "balance"). Should another node utilize "x" to determine "checkingAccountBalance," the variable name "x" may be replaced with the variable name "checkingAccountBalance," when encountered.

As a benefit of output 920 a representation of source code 604 may be provided to a user. As a result, nodes having more or fewer associations may be identified to aid a user in identifying more or less utilized code components. Additionally, the user may be presented with symbolic representations of one or more nodes and/or their associated portion of a source code. The symbols may be proper names, such as, "salesForcast," "balanceInquiry," etc., or more abstract (e.g., "Alpha," "Beta," etc.) to selectively present/hide a portion of the source code/nodes being examined by the user.

A source code may be enhanced beyond conversion to a language-agnostic form for output 902. In one embodiment, a source code may have substitutions for variables and/or function names. For example, all references to "log" or "logging" (e.g., logTransaction, logWithdrawal, logUserName, etc.) may be replaced (e.g., writeTransaction, writeWithdrawal, writeUserName, etc.). Operations may be regenerated based upon a non-functional standard. For example, a source may comprise a non-secure "write" operation and be regenerated to comprise a secure "write" operation (e.g., encryption, authentication, etc.). Similarly, documentation may be inserted, compliance with external standards implemented, and/or other functionality enhancements incorporated.

In another embodiment, nodes 702, 704, 706, 708, 710, 712, 718, and 722 comprise code (transformations, input variables, and output variables) provided to output 920. Node 720, having no node path portions, may then be omitted from the node path.

Figure 10:
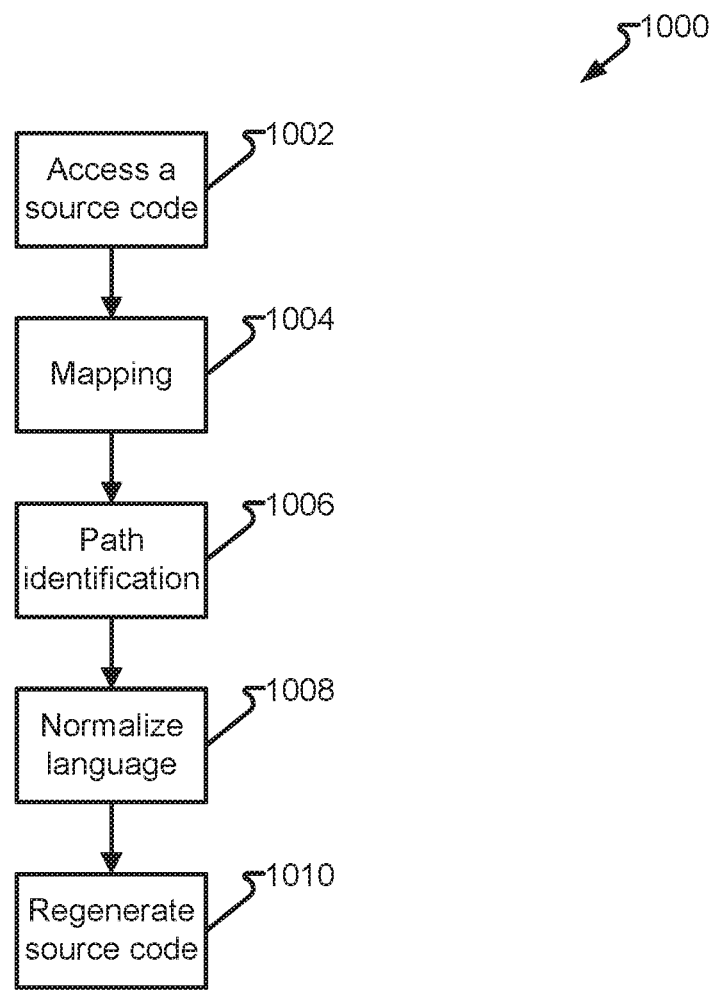
FIG. 10 depicts a process in accordance with embodiments of the present disclosure.

FIG. 10 depicts a process 1000 in accordance with embodiments of the present disclosure. Process 1000 is performed by at least one processor. In one embodiment, the processor accesses a source code, such as a processor accessing source code 604 residing in data repository 602, at step 1002. Step 1004 maps functions, and their associated inputs and outputs, to nodes. Step 1006 identifies a node path. Step 1008 normalizes the language to a language-agnostic language. Process 1000 may terminate at this stage, such as to accommodate processing at a later time, or process 1000 may continue to step 1010 wherein the source code is regenerated, such as to exclude unreachable code and to provide different and/or additional platform-specific and/or non-functional requirements based upon source code 604. Step 1010 may output regenerated/transformed source code, compiled/interpreted code, object module, library, API, executable, and/or other machine- or human-readable code.

Figure 11:
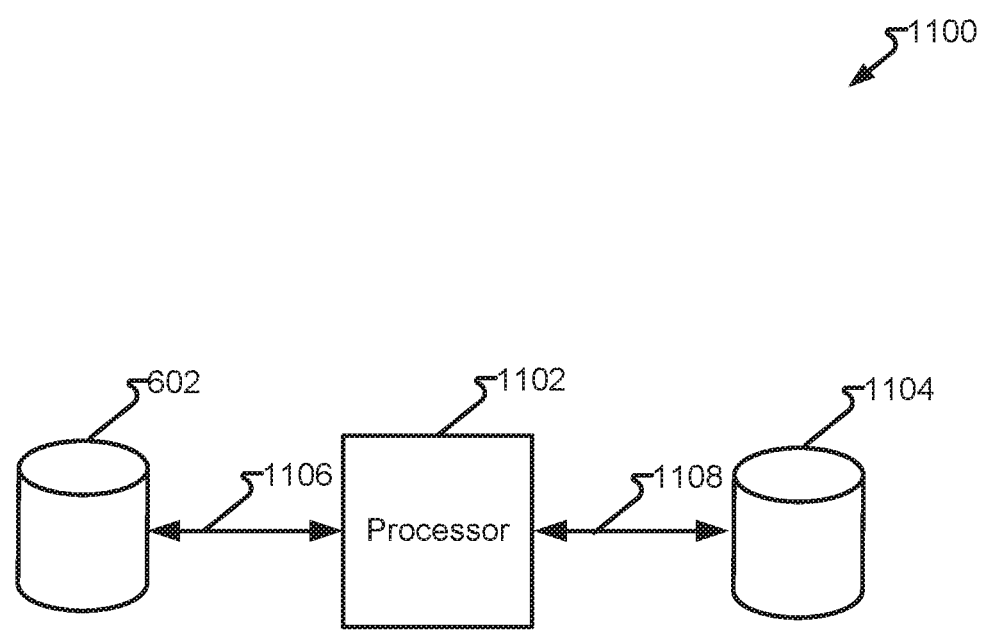
FIG. 11 depicts a system in accordance with embodiments of the present disclosure.

FIG. 11 depicts system 1100 in accordance with embodiments of the present disclosure capable of performing any of the methodology/techniques described herein. In one embodiment, source code 604 is maintained in data storage 602 and accessed, via connection 1106. Processor 1102 executes instructions to, in one embodiment, regenerate the source code. The regenerated source code may be stored in data storage 1104. In one embodiment, data storage 602 and data storage 1104 are the same data storage.

Processor 1102 may comprise a single processor, plurality of processors, blade, server, distributed processing network, virtual processor (executed by at least one other processor), and/or other processing device, component, and/or system. Data storage 602 and data storage 1104, when not the same, may comprise at least one of on-chip memory, on-board memory, backplane storage, integrated storage, networked storage, selectively networked storage (e.g., on-line storage that may be presently off-line), distributed storage (e.g., NAS, Internet, public cloud, private cloud, etc.). Accordingly, connection 1106 may comprise chip vias, chip traces, board vias, board trances, jumpers, ports, cables, public networks, private networks, and/or other connection conduits.

In accordance with another exemplary embodiment, the system 1100 can also be configured to performing the techniques described herein as Software as a Service. Here, the system 1100 would receive source code 604 (see, FIG. 6) via upload to processor 1102, such as via collection 1106 comprising the Internet and/or private network, from data storage 602 (e.g., a local storage device or system). Processor 1102 may be a single processor or a dedicated, shared, or distributed processor/processors within system. Processor 1102 may store the language-agnostic source code and/or regenerated source code within data storage 1104, such as to provide an accessible repository for the language-agnostic source code and/or regenerated source code, which may be accessible via an Internet or other connection to an authorized user-device. Data storage 1104 may further comprise an email server, FTP server, and/or other component operable to "push" the language-agnostic source code and/or regenerated source code to an authorized user-device. The language-agnostic source code and/or regenerated source code may then be further processed, such as compiled, translated, linked, etc., to configure another computing device to execute the instructions therein.

Figure 12A:
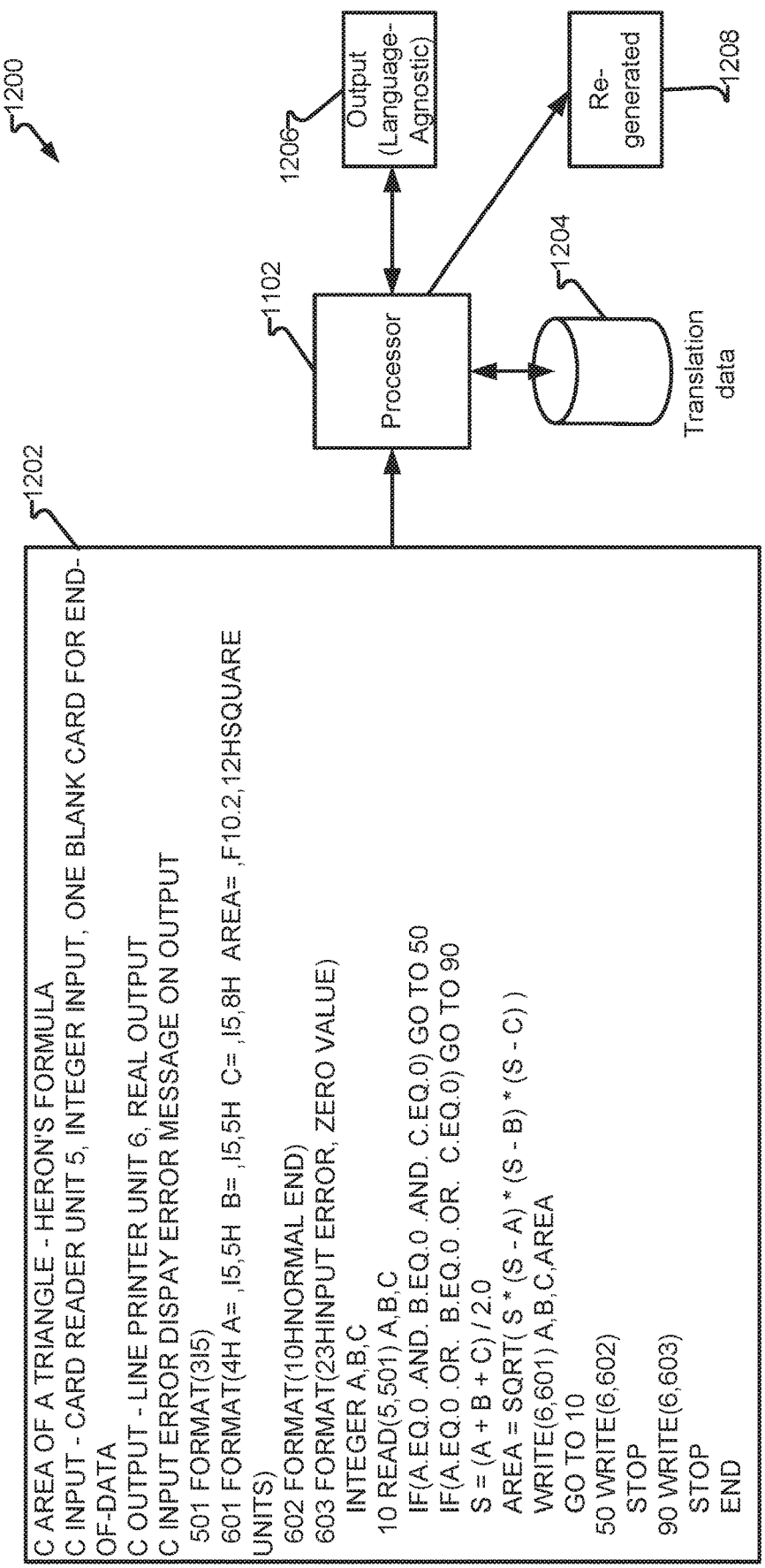

FIGS. 12A-12B depicts original source code 1202 regenerated as regenerated source code 1208. In one embodiment, processor 1102 accesses, original source code 1202, such as from data storage 602 (see, FIG. 6) and translation data from translation data storage 1204. The translation data selected is selected in accord with the programming language utilized for original source code 1202. Processor 1102 then generates output 1206 comprising language-agnostic source code. In another embodiment, processor 1102 regenerates regenerated source code 1208 from output 1206. In one example, as illustrated in FIG. 12B, original source code 1206 is regenerated, by processor 1102 utilizing translation data from translation data storage 1204, to regenerate regenerated source code 1208. As a result, one source code (e.g., original source code 1202) is converted by a processor into a language-agnostic source code (e.g., output 1206) and/or regenerated into a different source code (e.g., regenerated source code 1208).

Figure 13:
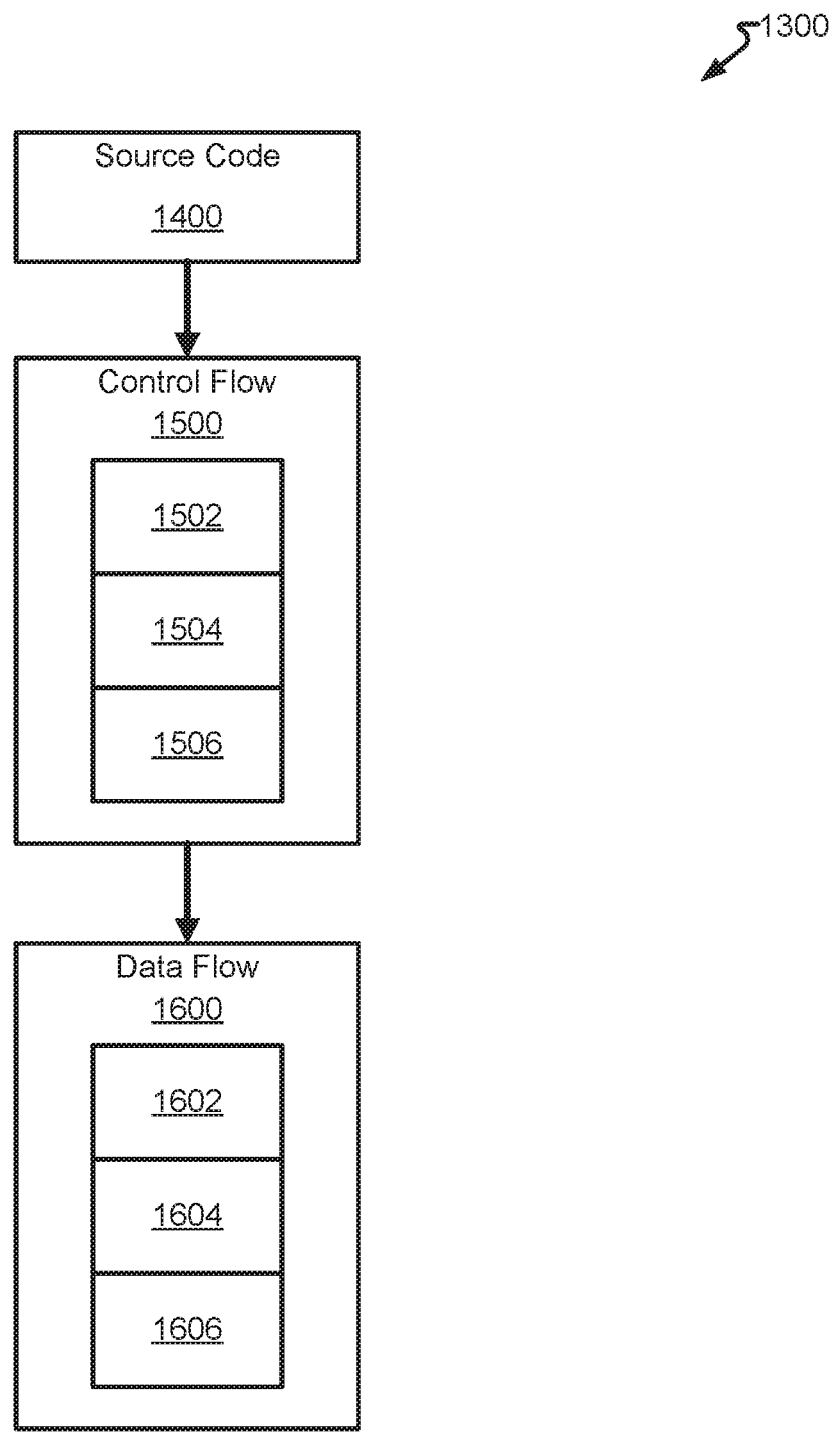
FIG. 13 depicts a transformation overview in accordance with embodiments of the present disclosure.
Figure 15D:
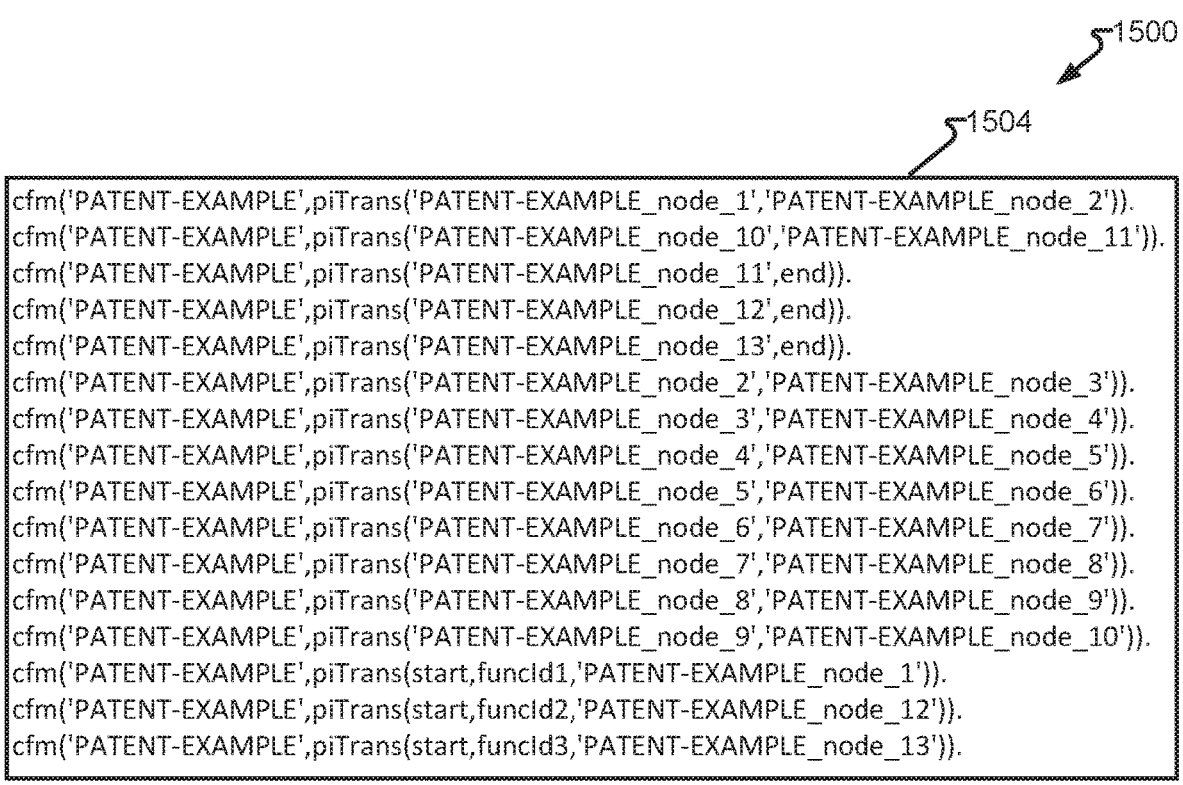
Figure 15E:
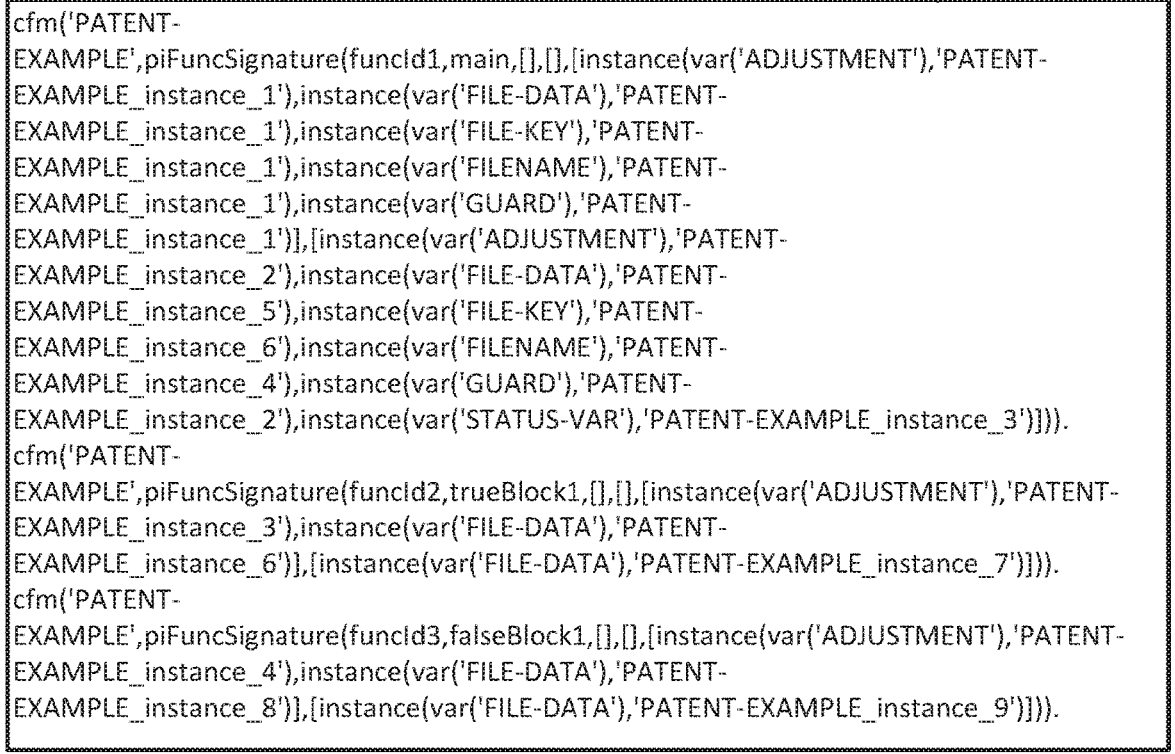
Figure 16D:
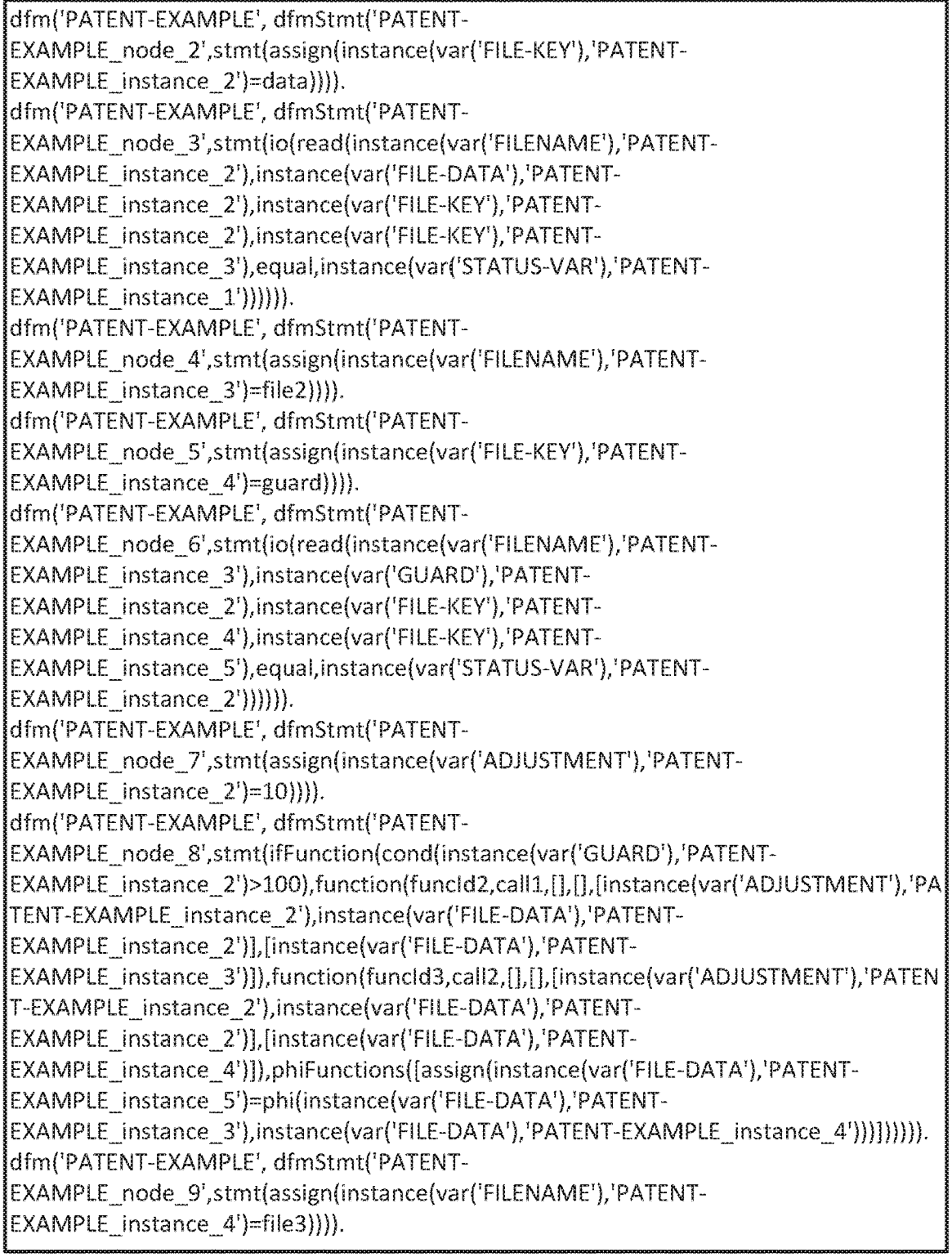
Figure 16E:
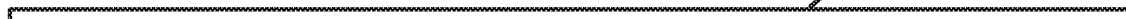
Figure 16F:
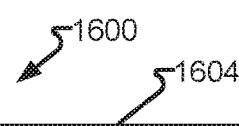
Figure 16G:
Figure 16H:
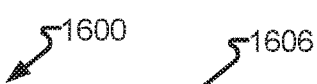
Figure 16I:
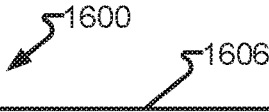

FIG. 13 depicts transformation overview 1300 in accordance with embodiments of the present disclosure. In one embodiment, source code 1400 is transformed, such as via processor 1102 accessing source code 1400, such as when maintained in data repository 602, for transformation. In one embodiment, the transformation comprises transforming source code 1400 into CFG representation 1500. In another embodiment, the transformation comprises transforming CFG representation 1500 into DFG representation 1600. Processor 1102 may output one or both of CFG representation 1500 and DFG representation 1600 to data repository 1104.

FIG. 14 depicts example original source code 1402 in accordance with embodiments of the present disclosure.

FIGS. 15A-15E depict example CFG representation 1500 in accordance with embodiments of the present disclosure. Example CFG representation 1500 comprises first CFG portion 1502, second CFG portion 1504, and third CFG portion 1506.

CFG representation 1500 comprises facts generated from source code 1400. In one embodiment, generation of CFG representation 1500 comprises performing, by a processor, such as processor 1102:

1) Parsing source code 1400;
2) Identifying all statements that comprise the program;
3) For each identified statement:
3(A) Determine a statement type;
3(B) Determine components of the statement based on statement type;
3(C) Generate CFG representation 1500 comprising operational semantics of the statements and further includes inputs variables and output variables for the statements;
3(D) Create a node representation for the statement;
3(E) Create an arc connecting the node for the statement with the node from a preceding statement;
3(F) If the statement is a conditional statement, perform:
3(F)(i) create a phi statement and a phi node;
3(F)(ii) set the conditional statement as the last statement and process the "true" block of the conditional statement. Also, connect the final node in the "true" block with the phi node.
3(F)(iii) set the conditional statement as the last statement and process the "false" block of the conditional statement. Also, connect the final node in the "false" block with the phi node.
3(F)(iv) set the phi node as the last statement node
4) Execute "static single assignment" to version all variables in the CFG representation. For example, "i(1), i(2)," of while loop 104 (see FIG. 1B).

In another embodiment, arcs, which are also known as node paths, are represented as "piTrans" facts in second CFG portion 1504.

FIGS. 16A-16J depict example DFG representation 1600 in accordance with embodiments of the present disclosure. Example DFG representation 1600 comprises first DFG portion 1602, second DFG portion 1604, and third DFG portion 1606. In one embodiment, DFG representation 1600 comprises arcs represented as "atomArcs" as illustrated in first DFG portion 1602 for backward dataflow arcs, or node paths, and "forwardAtomArcs" as illustrated in third DFG portion 1606 for forward dataflow arcs, or node paths.

In one embodiment, a processor, such as processor 1102, generates example DFG representation 1600 from example CFG representation 1500 by performing:

1) for each node in example CFG representation 1500:
1(A) for each input versioned variable (e.g., from "static single assignment"), perform:
1(A)(i): identify the node that contains the versioned variable within the set of outputs for the node;
1(A)(ii): create a DFG arc, or node path, connecting the output node with the current node and associate the arc with the versioned variable.

Example DFG representation 1600 is then available for further processing, such as by processor 1102 regenerating DFG representation 1600 into another language/version of source code 1400. Processor 1102 may further insert non-functional requirements into the regenerated source code, such as to comprise documentation, security, application of coding standards, and/or other enhancements/features/functionality beyond or alternatively to those provided by source code 1400.

Embodiments disclosed include any one or more of the aspects as substantially disclosed herein:

A method, comprising:
  accessing, by a processor, a first source code comprising functions;
  mapping, by the processor, ones of the functions to a corresponding ones of nodes, the mapping further comprising, for ones of the nodes:
    mapping an input of the function to an input variable of the node;
    mapping an output of the function to an output variable of the node; and
    mapping an operation of the function to a transformation of the node and wherein the operation of the function transforms the input of the function to the output of the function; and
  identifying, by the processor, a path comprising a number of path nodes, the path nodes comprise nodes having an input common with the output of another node;
  wherein at least one path node is a terminal node having the output variable mapped to at least one of the functions providing an output of the first source code;
  wherein at least one path node is an intermediate node having the input variable in common with the output variable of at least one of the number of nodes;
  transforming, by the processor, the path nodes into a normalized language-agnostic code comprising a plurality of components; and
  regenerating a second source code from the plurality of components.

Wherein the terminal node comprises at least one intermediate node.

Wherein the number of path nodes further comprise an instantiation node comprising the transformation of at least one of the nodes whereby a variable is instantiated that, at least in part, determines a value of the output variable of the terminal node.

Wherein the second source code is a functional equivalent of the first source code.

Wherein the second source code corresponds to a preferred version of the first source code.

Wherein identifying the path further comprises omitting from the normalized language-agnostic code at least one node that is not a path node.

Any one or more of the disclosed embodiments, further comprising, the processor performing:
identifying a first variable name in the first source code having a first semantic meaning and mapped to a first path node;
identifying a second variable name in the first source code having a second semantic meaning and mapped to a second path node;
upon determining, by the processor, that the output of the first path node is common with the input of the second path node, determining a more meaningful semantic meaning between the first semantic meaning and the second semantic meaning; and
wherein the mapping further comprises renaming one of the first variable name or the second variable name that is associated with the determined less meaningful semantic meaning to the other of the first variable name or the second variable name this is associated with the determined more meaningful semantic meaning.

Wherein the mapping of the input variable of at least one of the nodes to the input of the mapped function comprises one or more of (1) mapping a plurality of input variables to a plurality of inputs of the mapped function and (2) mapping the plurality of output variables to the plurality of outputs of the mapped function.

Wherein at least one node comprises a comment documenting the transformation of the at least one node.

Any one or more of the disclosed embodiments, further comprising the processor, modifying the second source code to cause at least a portion of the second source code to comprise a preferred source code.

Wherein the identification of at least one of the nodes path, further comprises, identifying, by the processor, an instance path comprising the path nodes associated with a previously determined possible output of the terminal node.

Wherein the normalized language-agnostic code comprises applying, by the processor, a comment documenting the transforming step of a plurality of the path nodes in combination.

A system, comprising:
a data storage; and
a processor;
wherein the processor is programmed to perform:
  accessing, from the data storage by the processor, a first source code comprising functions;
  mapping, by the processor, ones of the functions to a corresponding ones of nodes, the mapping further comprising, for ones of the nodes:
    mapping an input of the function to an input variable of the node;
    mapping an output of the function to an output variable of the node; and
    mapping an operation of the function to a transformation of the node and wherein the operation of the function transforms the input of the function to the output of the function; and
  identifying, by the processor, a path comprising a number of path nodes, the path nodes comprise nodes having an input common with the output of another node;
  wherein at least one path node is a terminal node having the output variable mapped to at least one of the functions providing an output of the first source code;
  wherein at least one path node is an intermediate node having the input variable in common with the output variable of at least one of the number of nodes;
  transforming, by the processor, the path nodes into a normalized language-agnostic code comprising a plurality of components;
  regenerating a second source code from the plurality of components; and
  storing the second source code in the data storage.

Wherein the terminal node comprises at least one intermediate node.

Wherein the number of path nodes further comprises an instantiation node comprising the transformation of at least one of the nodes whereby a variable is instantiated that, at least in part, determines of a value of the output variable of the terminal node.

Wherein the processor mapping of the input variable of at least one of the nodes to the input of the mapped function comprises one or more of (1) mapping a plurality of input variables to a plurality of inputs of the mapped function and (2) mapping the plurality of output variables to the plurality of outputs of the mapped function.

Wherein at least one node comprises a comment documenting the transformation of the at least one node.

Any one or more of the disclosed embodiments, further comprising the processor modifying the second source code to cause at least a portion of the second source code to comprise a preferred source code.

A system, comprising:
means to access, by a processor, a first source code comprising functions;
means to map, by the processor, ones of the functions to a corresponding ones of nodes, the mapping further comprising, for ones of the nodes:
  mapping an input of the function to an input variable of the node;
  mapping an output of the function to an output variable of the node; and
  mapping an operation of the function to a transformation of the node and wherein the operation of the function transforms the input of the function to the output of the function; and
means to identify, by the processor, a path comprising a number of path nodes, the path nodes comprise nodes having an input common with the output of another node;
wherein at least one path node is a terminal node having the output variable mapped to at least one of the functions providing an output of the first source code;
wherein at least one path node is an intermediate node having the input variable in common with the output variable of at least one of the number of nodes; means to transform, by the processor, the path nodes into a normalized language-agnostic code comprising a plurality of components; and
means to generate a second source code from the plurality of components.

Wherein the number of path nodes further comprises an instantiation node comprising the transformation of at least one of the nodes whereby a variable is instantiated that, at least in part, determines the value of the output variable of the terminal node.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function, to the calling function, or the main function.

Additionally, the systems, methods and protocols can be implemented to improve one or more of a special-purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols, and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22nm Haswell, Intel® Core® i5-3570K 22nm Ivy Bridge, the AMD® FX™ family of processors, AMD® FX-4300, FX-6300, and FX-8350 32nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using objects of an object-oriented software language that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods, and protocols illustrated herein can be readily implemented in hardware and/or software using any known or later-developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special-purpose computer, a microprocessor, or the like. In these instances, the systems and methods can be implemented as programs embedded on a personal computer such as an applet, JAVA®, or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as, but not limited to, read only memory (ROM); random access memory (RAM); magnetic disk storage media; optical storage media; a flash memory; etc.

Provided herein are exemplary systems and methods for spatial reuse in a communications environment. While the embodiments have been described in conjunction with a number of embodiments, it is evident that many alternatives, modifications, and variations would be or are apparent to those of ordinary skill in the applicable arts. Accordingly, this disclosure is intended to embrace all such alternatives, modifications, equivalents, and variations that are within the spirit and scope of this disclosure.

What is claimed is:
1. A method, comprising:
    accessing, by a processor, a first source code comprising functions: mapping, by the processor, ones of the functions to a corresponding dependency-ordered behavior representation generated from a control-flow graph representation by rearranging graph edges from control flow dependencies to data state dependencies comprising a set of nodes, the mapping further comprising, for ones of the nodes: mapping an input of the function to an input variable of the node; mapping an output of the function to an output variable of the node, and mapping an operation of the function to a transformation of the node and wherein the operation of the function transforms the input, of the function to the output of the function; and identifying, by the processor, a path comprising a number of path nodes, the path nodes comprise nodes having an input common with the output of another node;

wherein at least one path node is a terminal node having the output variable mapped to at least one of the functions providing an output of the first source code;

wherein at least one path node is an intermediate node having the input variable in common with the output variable of at least one of the number of nodes;

transforming, by the processor, the path nodes into a normalized language-agnostic representation that preserves data flow encoded within the program and provides assurances that the data flow are correct and complete comprising a plurality of components; and regenerating, from the plurality of components, the normalized language-agnostic representation into a programming language alternative to that of the first source code or into an enhanced version of the first source code, wherein the mapping further comprises:

identifying a first variable name in the first source code having a first semantic meaning and mapped to a first path node;

identifying a second variable name in the first source code having a second semantic meaning and mapped to a second path node;

upon determining, by the processor, that the output of the first path node is common with the input of the second path node, determining a new semantic meaning between the first semantic meaning and the second semantic meaning, and wherein the mapping further comprises renaming one of the first variable name or the second variable name that is associated with the first or second semantic meaning to the other of the first variable name or the second variable name that is associated with the determined new semantic meaning.

2. The method of claim 1, wherein the terminal node comprises at least one intermediate node and the enhanced version of the first source code is based on non-functional standards.

3. The method of claim 1, wherein the number of path nodes further comprise an instantiation node comprising the transformation of at least one of the nodes whereby a variable is instantiated that, at least in part, determines a value of the output variable of the terminal node.

4. The method of claim 1, wherein the enhanced version of the first source code is a functional equivalent of the first source code.

5. The method of claim 1, wherein the enhanced version of the first source code corresponds to an optimized version of the first source code.

6. The method of claim 1, wherein identifying the path further comprises omitting from the normalized language-agnostic code at least one node that is not a path node.

7. The method of claim 1, wherein the mapping of the input variable of at least one of the nodes to the input of the mapped function comprises one or more of (1) mapping a plurality of input variables to a plurality of inputs of the mapped function and (2) mapping the plurality of output variables to the plurality of outputs of the mapped function.

8. The method of claim 1, wherein at least one node comprises a comment documenting the transformation of the at least one node.

9. The method of claim 1, further comprising the processor, modifying the enhanced version of the first source code to cause at least a portion of the enhanced version of the first source code to comprise an optimized source code.

10. The method of claim 1, wherein the identification of at least one of the nodes path, further comprises, identifying, by the processor, an instance path comprising the path nodes associated with a previously determined possible output of the terminal node.

11. The method of claim 1, wherein the normalized language-agnostic code comprises applying, by the processor, a comment documenting the transforming step of a plurality of the path nodes in combination.

12. A system, comprising:
a data storage; and a processor; wherein the processor is programmed to perform:

accessing, from the data storage by the processor, a first source code comprising functions;

mapping, by the processor, ones of the functions to a corresponding dependency-ordered behavior representation generated from a control-flow graph representation by rearranging graph edges from control flow dependencies to data state dependencies comprising a set of nodes, the mapping further comprising, for ones of the nodes;

mapping an input of the function to an input variable of the node;

mapping an output of the function to an output variable of the node;

mapping an operation of the function to a transformation of the node and wherein the operation of the function transforms the input of the function to the output of the function;

identifying, by the processor, a path comprising a number of path nodes, the path nodes comprise nodes having an input common with the output of another node;

wherein at least one path node is a terminal node having the output variable mapped to at least one of the functions providing an output of the first source code;

wherein at least one path node is an intermediate node having the input variable in common with the output variable of at least one of the number of nodes;

transforming, by the processor, the path nodes into a normalized language-agnostic representation that preserves data flow encoded within the program and provides assurances that the data flow are correct and complete comprising a plurality of components;

regenerating, from the plurality of components, the normalized language-agnostic representation into a programming language alternative to that of the first source code or into an enhanced version of the first source code; and storing the programming language alternative or the enhanced version of the first source code in the data storage;

wherein the mapping further comprises:

identifying a first variable name in the first source code having a first semantic meaning and mapped to a first path node;

identifying a second variable name in the first source code having a second semantic meaning and mapped to a second path node;

upon determining, by the processor, that the output of the first path node is common with the input of the second path node, determining a new semantic meaning between the first semantic meaning and the second semantic meaning, and wherein the mapping further comprises renaming one of the first variable name or the second variable name that is associated with the first or second semantic meaning to the other of the first variable name or the second variable name that is associated with the determined new semantic meaning.

13. The system of claim 12, wherein the terminal node comprises at least one intermediate node and the enhanced version of the first source code is based on non-functional standards.

14. The system of claim 12, wherein the number of path nodes further comprises an instantiation node comprising the transformation of at least one of the nodes whereby a variable is instantiated that, at least in part, determines of a value of the output variable of the terminal node.

15. The system of claim 12, wherein the processor mapping of the input variable of at least one of the nodes to the input of the mapped function comprises one or more of (1) mapping a plurality of input variables to a plurality of inputs of the mapped function and (2) mapping the plurality of output variables to the plurality of outputs of the mapped function.

16. The system of claim 12, wherein at least one node comprises a comment documenting the transformation of the at least one node.

17. The system of claim 12, further comprising the processor modifying the enhanced version of the first source code to cause at least a portion of the enhanced version of the first source code to comprise an optimized source code.

18. A system, comprising:

means to access, by a processor, a first source code comprising functions;

means to map, by the processor, ones of the functions to a corresponding dependency-ordered behavior representation generated from a control-flow graph representation by rearranging graph edges from control flow dependencies to data state dependencies comprising a set of nodes, the mapping further comprising, for ones of the nodes;

mapping an input of the function to an input variable of the node;

mapping an output of the function to an output variable of the node;

mapping an operation of the function to a transformation of the node and wherein the operation of the function transforms the input of the function to the output of the function; and means to identify, by the processor, a path comprising a number of path nodes, the path nodes comprise nodes having an input common with the output of another node;

wherein at least one path node is a terminal node having the output variable mapped to at least one of the functions providing an output of the first source code;

wherein at least one path node is an intermediate node having the input variable in common with the output variable of at least one of the number of nodes;

means to transform, by the processor, the path nodes into a normalized language-agnostic representation that preserves data flow encoded within the program and provides assurances that the data flow are correct and complete comprising a plurality of components; and means to generate, by the processor, from the plurality of components, the normalized language-agnostic representation into a programming language alternative to that of the first source code or into an enhanced version of the first source code;

wherein the mapping further comprises:

means to identify, by the processor, a first variable name in the first source code having a first semantic meaning and mapped to a first path node;

means to identify, by the processor, a second variable name in the first source code having a second semantic meaning and mapped to a second path node;

upon determining, by the processor, that the output of the first path node is common with the input of the second path node, determining by the processor, a new semantic meaning between the first semantic meanie and the second semantic meaning, and wherein the mapping further comprises renaming by the processor one of the first variable name or the second variable name that is associated with the first or second semantic meaning to the other of the first variable name or the second variable name that is associated with the determined new semantic meaning.

19. The system of claim 18, wherein the number of path nodes further comprises an instantiation node comprising the transformation of at least one of the nodes whereby a variable is instantiated that, at least in part, determines the value of the output variable of the terminal node.

* * * * *